United States Patent
Perelli et al.

(10) Patent No.: US 12,265,429 B2
(45) Date of Patent: Apr. 1, 2025

(54) DISPLAY DEVICE

(71) Applicant: LENOVO (SINGAPORE) PTE. LTD, Singapore (SG)

(72) Inventors: Thomas Perelli, Durham, NC (US); Ali Ent, San Francisco, CA (US); Ashley Martin Cichocki, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/553,341

(22) Filed: Dec. 16, 2021

(65) Prior Publication Data
US 2023/0195176 A1    Jun. 22, 2023

(51) Int. Cl.
*G06F 1/16* (2006.01)
*F16M 13/00* (2006.01)
*G06F 3/16* (2006.01)

(52) U.S. Cl.
CPC ......... *G06F 1/1681* (2013.01); *F16M 13/005* (2013.01); *G06F 1/1688* (2013.01); *G06F 3/167* (2013.01); *F16C 2202/42* (2013.01); *F16M 2200/021* (2013.01)

(58) Field of Classification Search
CPC ...... G06F 1/1681; G06F 1/1688; G06F 3/167; F16C 11/10; F16C 2202/42; F16M 13/005; F16M 2200/021
See application file for complete search history.

(56) References Cited

U.S. PATENT DOCUMENTS

| | | | |
|---|---|---|---|
| 7,318,521 B2* | 1/2008 | Lau | A45C 11/00 206/45.24 |
| 8,988,876 B2* | 3/2015 | Corbin | G06F 3/04883 361/679.58 |
| 8,997,983 B2* | 4/2015 | Sajid | G06F 1/1628 206/320 |
| 9,335,793 B2* | 5/2016 | Rothkopf | G06F 3/04883 |
| 9,384,886 B2* | 7/2016 | Henty | F16M 11/041 |
| 9,494,980 B2* | 11/2016 | Corbin | G06F 3/0202 |
| 10,037,054 B2* | 7/2018 | Corbin | G06F 3/1446 |
| 10,269,485 B2* | 4/2019 | Henty | F16M 11/06 |
| 10,303,215 B2* | 5/2019 | Corbin | A63B 71/0622 |
| 10,488,883 B2* | 11/2019 | Rothkopf | G06F 1/1654 |
| 10,671,121 B2* | 6/2020 | Zhu | G06F 1/1637 |
| 10,712,777 B2* | 7/2020 | Corbin | A45C 15/00 |
| 10,902,999 B2* | 1/2021 | Henty | A45F 5/00 |
| 10,955,875 B2* | 3/2021 | Zhu | G06F 3/0202 |
| 11,009,907 B2* | 5/2021 | Hong | G06F 1/1694 |
| 11,169,653 B2* | 11/2021 | Aurongzeb | G06F 1/1675 |
| 11,347,367 B2* | 5/2022 | Hong | G06F 1/1641 |
| 11,437,187 B2* | 9/2022 | Henty | F16M 11/06 |
| 11,656,654 B2* | 5/2023 | Hong | G06F 1/1624 361/679.27 |
| 2006/0060476 A1* | 3/2006 | Lau | A45C 11/00 206/320 |

(Continued)

*Primary Examiner* — Anthony M Haughton
*Assistant Examiner* — Theron S Milliser
(74) *Attorney, Agent, or Firm* — Brian J. Pangrle

(57) ABSTRACT

A device can include a housing that comprises a front side that includes a display operatively coupled to display circuitry and a back side that comprises a ferromagnetic surface, a hinge assembly, and a recess; and a ferromagnetic panel transitionable via the hinge assembly from a storage position in the recess to a bridge position that covers the ferromagnetic surface.

19 Claims, 19 Drawing Sheets

(56) References Cited

U.S. PATENT DOCUMENTS

| | | | |
|---|---|---|---|
| 2010/0238620 A1* | 9/2010 | Fish | G06F 1/1654 |
| | | | 361/679.29 |
| 2011/0284420 A1* | 11/2011 | Sajid | G06F 3/0202 |
| | | | 206/576 |
| 2012/0194448 A1* | 8/2012 | Rothkopf | G06F 1/1643 |
| | | | 361/679.01 |
| 2012/0211377 A1* | 8/2012 | Sajid | G06F 1/1628 |
| | | | 206/216 |
| 2013/0293430 A1* | 11/2013 | Henty | A45F 5/00 |
| | | | 343/720 |
| 2014/0049911 A1* | 2/2014 | Corbin | H04B 1/3822 |
| | | | 361/679.58 |
| 2015/0153783 A1* | 6/2015 | Corbin | A45C 15/00 |
| | | | 361/679.56 |
| 2016/0224125 A1* | 8/2016 | Sajid | G06F 1/1628 |
| 2016/0224238 A1* | 8/2016 | Rothkopf | G06F 1/1652 |
| 2016/0240308 A1* | 8/2016 | Henty | A45F 5/00 |
| 2017/0010633 A1* | 1/2017 | Corbin | A45C 11/00 |
| 2019/0064878 A1* | 2/2019 | Corbin | G06F 1/1616 |
| 2019/0278329 A1* | 9/2019 | Corbin | G06F 1/1673 |
| 2020/0013548 A1* | 1/2020 | Henty | H01F 38/14 |
| 2020/0089276 A1* | 3/2020 | Zhu | G06F 1/1637 |
| 2020/0233451 A1* | 7/2020 | Hong | G06F 1/1681 |
| 2020/0233536 A1* | 7/2020 | Hong | G06F 1/1641 |
| 2020/0233537 A1* | 7/2020 | Hong | G06F 1/1694 |
| 2020/0233538 A1* | 7/2020 | Aurongzeb | G06F 1/166 |
| 2020/0241598 A1* | 7/2020 | Zhu | H01R 24/66 |
| 2021/0112673 A1* | 4/2021 | Huttula | G06F 1/1641 |
| 2021/0181789 A1* | 6/2021 | Hong | G06F 1/1624 |
| 2021/0287851 A1* | 9/2021 | Henty | F16B 1/00 |
| 2023/0215622 A1* | 7/2023 | Henty | H01Q 1/2258 |
| | | | 248/472 |

* cited by examiner

DISPLAY DEVICE

TECHNICAL FIELD

Subject matter disclosed herein generally relates to technology for computing devices.

BACKGROUND

Various types of computing devices have one or more housings. For example, a tablet computing device (e.g., a tablet) can have a single housing with a display and a notebook computing device (e.g., a notebook) can have two housings where one of the housings is a display housing and the other one of the housings is a keyboard housing where the two housings are coupled by a hinge assembly.

SUMMARY

A device can include a housing that comprises a front side that includes a display operatively coupled to display circuitry and a back side that comprises a ferromagnetic surface, a hinge assembly, and a recess; and a ferromagnetic panel transitionable via the hinge assembly from a storage position in the recess to a bridge position that covers the ferromagnetic surface. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
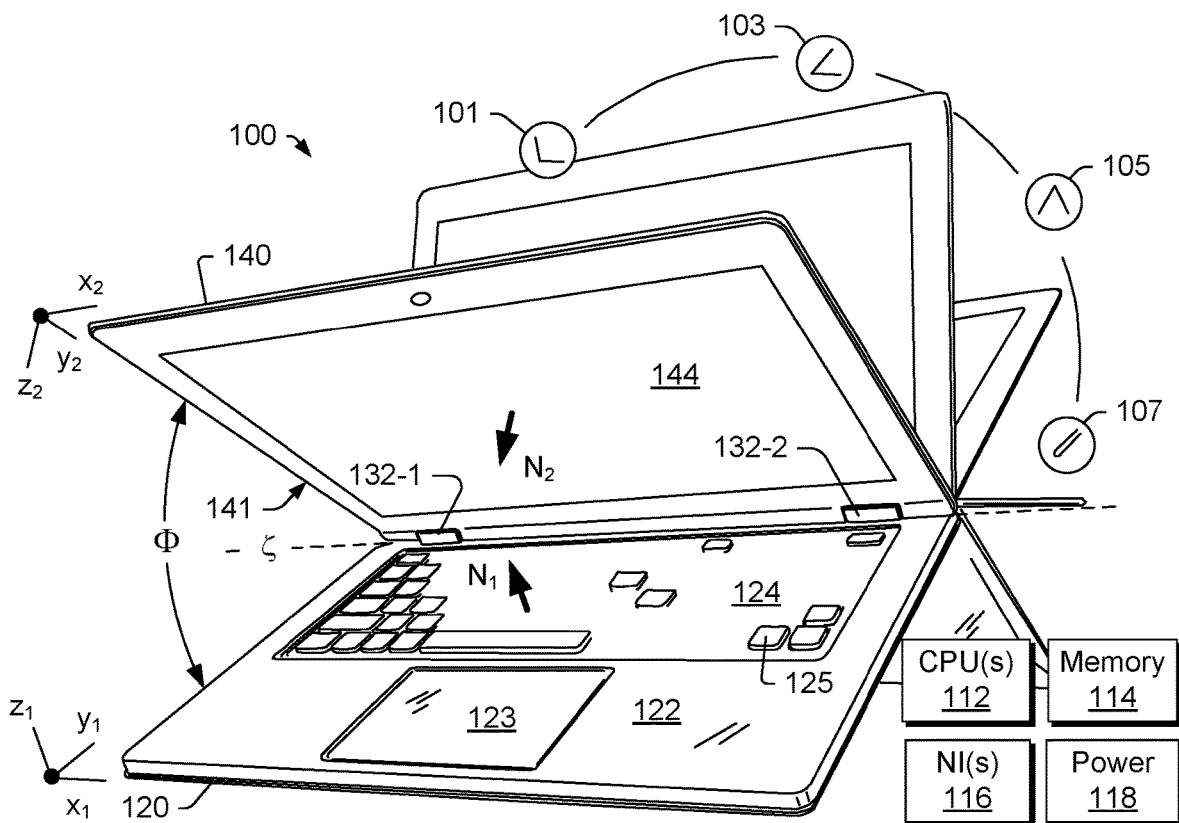
FIG. 1 is a series of diagrams of an example of a device.
Figure 1:
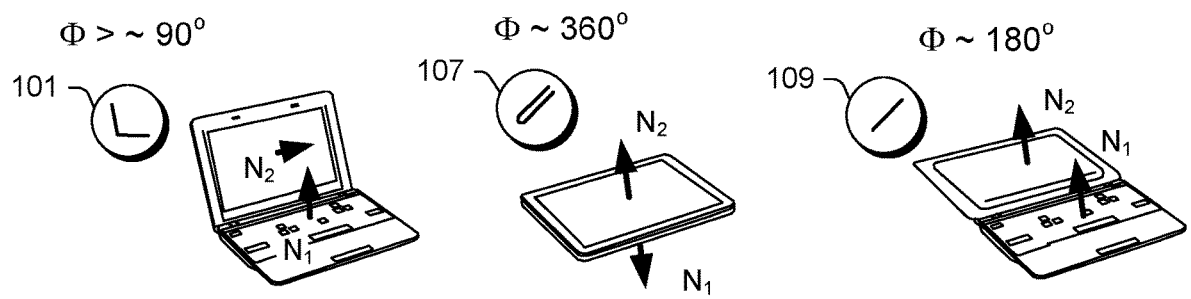

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a system such as, for example, a computing system (e.g., an information handling device, etc.).

As an example, the device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 141 with a display surface 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 141 is defined in a second Cartesian coordinate system as having a width along an x-axis ($x_2$), a depth along a y-axis ($y_2$) and a height or thickness along a z-axis ($z_2$) that extends in a direction outwardly away from the viewing surface 144 of the display 141. As an example, a coordinate system may be right-handed or left-handed. In various examples, a footprint may be defined by an area such as an area in an x,y-plane.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 141 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing system to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 141 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 141 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 (e.g., normal to an $x_1,y_1$-plane) and a normal outward vector $N_2$ of the display 141 of the display housing 140 (e.g., normal to an $x_2,y_2$-plane) are oriented in oppositely pointing directions, pointing away from each other; whereas, in contrast, for a closed orientation of the device 100 (e.g., where the angle $\Phi$ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis $\zeta$) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle $\Phi$ is about 180 degrees such that a normal outward vector $N_1$ of the keyboard 124 of the keyboard housing 120 and a normal outward vector $N_2$ of the display 141 of the display housing 140 are oriented in approximately the same pointing directions.

Various computing systems such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2A:
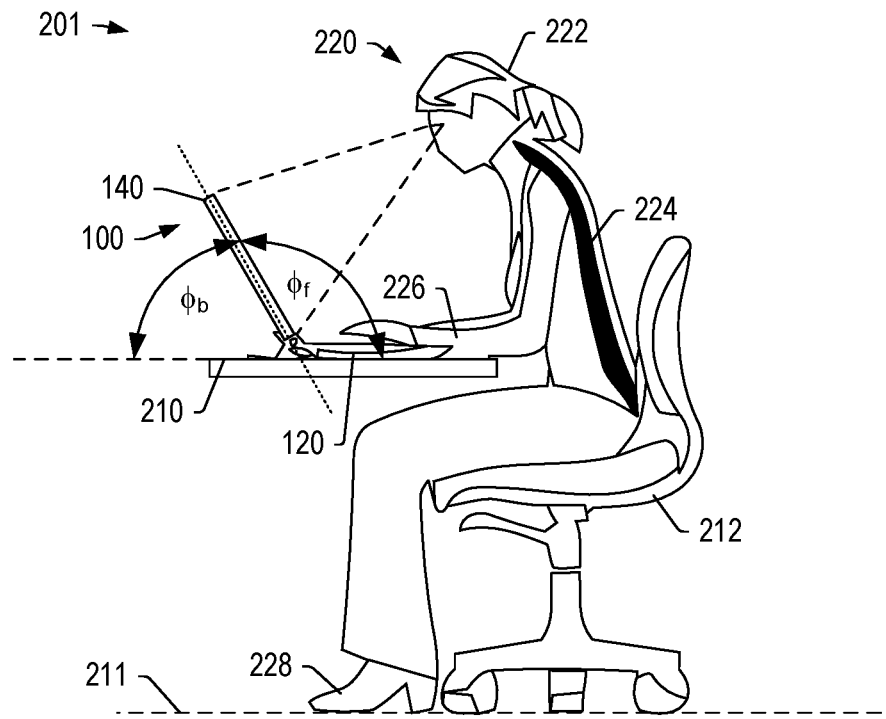
FIG. 2A and FIG. 2B are a series of diagrams of user scenarios for the device of FIG. 1.
Figure 2B:
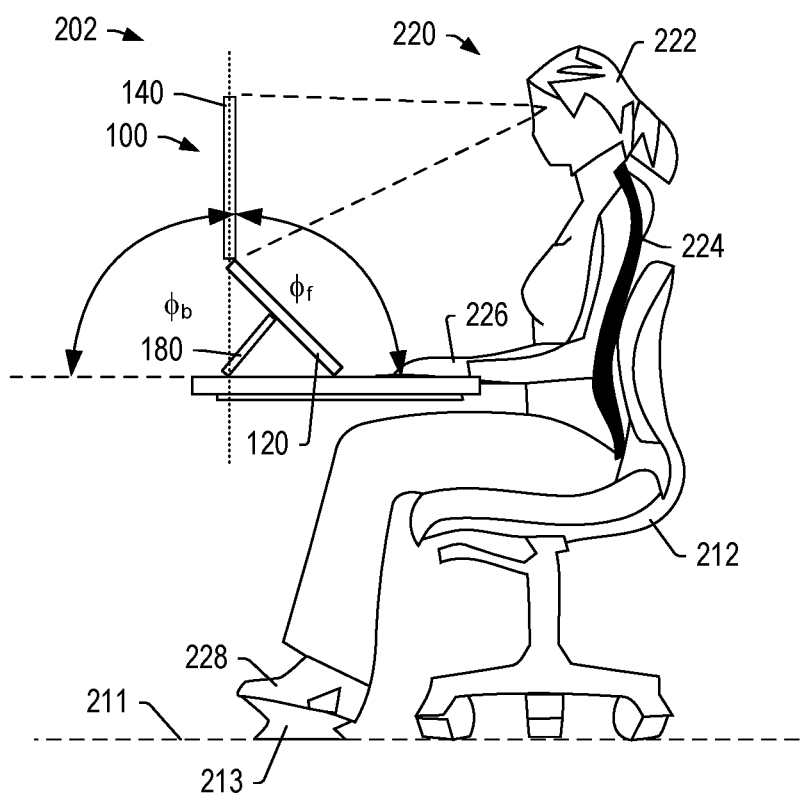

FIG. 2A and FIG. 2B show example scenarios 201 and 202 for a user 220 using the device 100 where the scenario 201 corresponds to less optimal ergonomics and the scenario 202 corresponds to improved ergonomics. As shown, the device 100 is supported on a surface 210 that is parallel to a floor surface 211 where a chair 212 is positioned on the floor surface 211. As shown, the user 220 includes a head 222, a spine 224, arms with hands 226 and feet 228. The user 220 is seated on the chair 212 with hands 226 at least in part supported on the surface 210.

In the scenario 201, the device 100 is supported by the housing 120 on the surface 210 and open such that the display housing 140 forms angles with the surface 210, which include a back side angle $\phi_b$ and a front side angle $\phi_f$, where the front side angle $\phi_f$ is greater than 90 degrees (e.g., approximately 91 degrees to 135 degrees) and, hence, the back side angle is less than 90 degrees (e.g., approximately 45 degrees to 89 degrees). As shown, the user 220 must curve her spine 224 to angle her head 222 to view the display of the display housing 140.

In the scenario 202, the display housing 140 is elevated through use of a stand 180 such that the back side angle $\phi_b$ and the front side angle $\phi_f$ are approximately equal (e.g., equal to approximately 90 degrees+/−10 degrees). With the display housing 140 elevate to a greater height with respect to the surface 210 and at an approximately 90 degree angle, the user 220 can sit up more straight in the chair 212 such that her spine 224 can be in a more natural and stacked position with the head 222 approximately directly above the spine 224. In such an example, the user 220 may utilize a foot rest 213 to rest her feet 228, which may improve support of the user's body on the chair 212.

As shown in FIG. 2A, spine alignment problems may give rise to fatigue when using a device such as a notebook. As explained, and shown in FIG. 2B, a stand may be available as an accessory to raise a display higher for improved posture such that the top leading edge of the display's active area is at eye level (e.g., for the anthropometric 50 percentile of adult-sized users).

However, having a notebook's display raised by an accessory stand can make the notebook's keyboard unusable because of the steep angle. For example, in the scenario 202, the user 220 may have to use an accessory keyboard (e.g., a keyboard external to the device 100).

Where a user's workstation has an accessory display, a user may position a notebook on a stand such that a display of the notebook is substantially even with a level of the accessory display. With multiple displays, a user may be more efficient and experience less fatigue. In some instances, a user may rely on workstation displays alone without use of a notebook's display but with use of the compute and network resources of the notebook (e.g., by plugging in one or more displays to the notebook, directly and/or through a docking station). Increased display area can allow a user to more effectively multitask, coordinate use of applications, etc.

Figure 3:
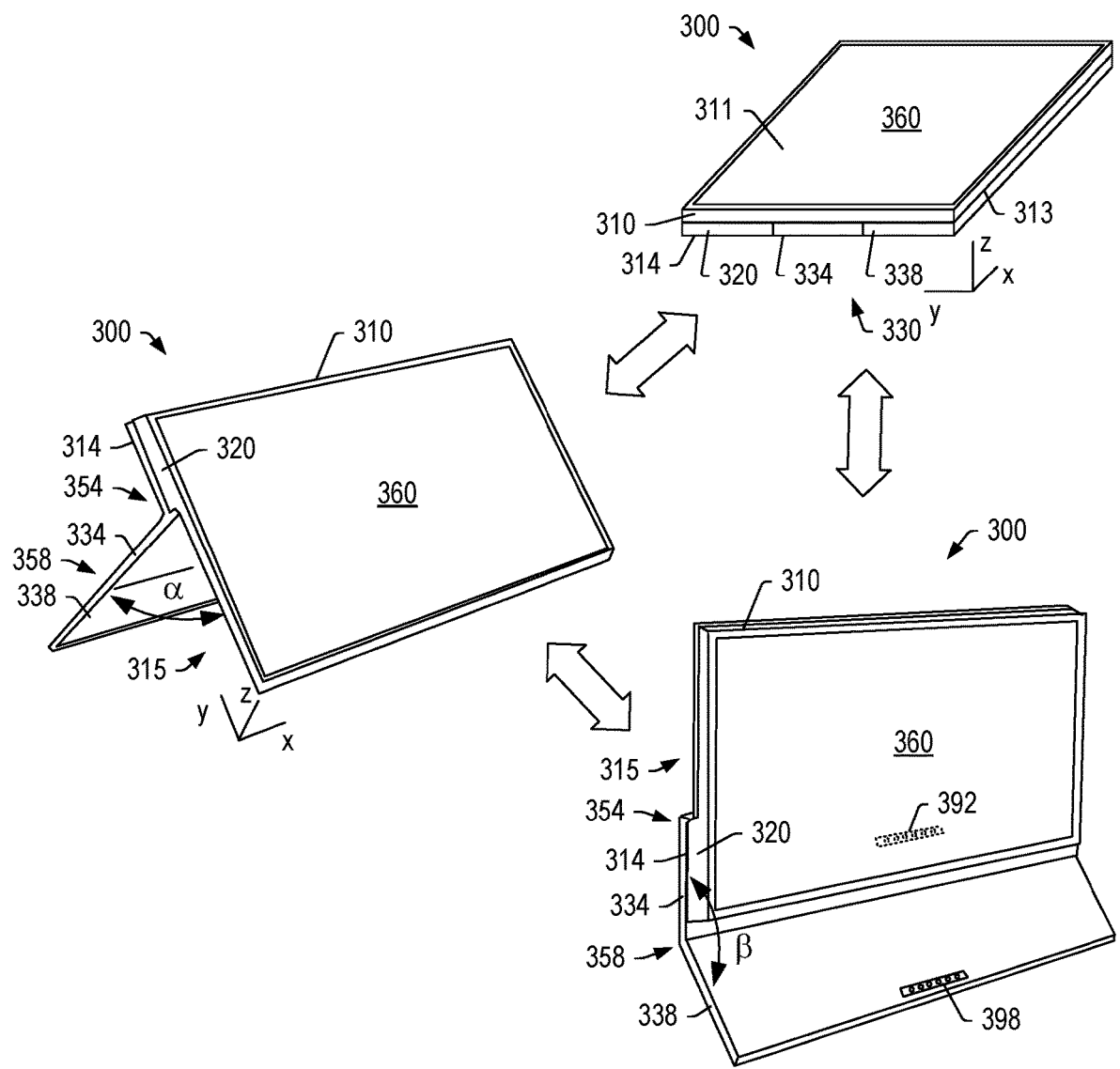
FIG. 3 is a series of perspective view of an example of a device.

FIG. 3 shows an example of a device 300 (e.g., a display device) that includes a housing 310 that includes a front side 311 that includes a display 360 operatively coupled to display circuitry and a back side 313 that includes a ferromagnetic surface 314, a hinge assembly 354, and a recess 315; and a ferromagnetic panel 330 transitionable via the hinge assembly 354 from a storage position in the recess 315 to a bridge position that covers the ferromagnetic surface 314. As shown in the example of FIG. 3, the ferromagnetic panel 330 can include an intermediate position such as a kickstand position that can support the device 300 on a tabletop, desktop, countertop, etc., such that the display 360 faces outwardly at an angle (e.g., a viewing angle).

In the example of FIG. 3, the ferromagnetic panel 330 can be a single panel or can include sub-panels. For example, the ferromagnetic panel 330 can include sub-panels 334 and 338. In such an example, the hinge assembly 354 can be a first hinge assembly and a hinge assembly 358 can be a second hinge assembly.

In the example of FIG. 3, a Cartesian coordinate system (x, y and z) is shown with respect to the device 300. As shown, the display 360 can be defined via the x and y coordinates where the display 360 can be a planar display with an area defined using a width along the x coordinate axis and a height along the y coordinate axis. As an example, the ferromagnetic panel 330 and the housing 310 may be defined in terms of thickness via the z coordinate.

As shown, the ferromagnetic panel 330 can be transitioned via the hinge assembly 354 where an angle $\alpha$ can be defined between the ferromagnetic panel 330 and the housing 310. As shown, the angle $\alpha$ may be 0 degrees, an angle between 0 degrees and 180 degrees, or 180 degrees. As shown, the ferromagnetic panel 330 can include the sub-panels 334 and 338 where the sub-panel 338 may be adjusted to a desired angle $\beta$.

As shown in FIG. 3, the device 300 can include a portion 320 that can be part of the housing 310 or that can be part of the ferromagnetic panel 330. The portion 320 defines at least a portion of the recess 315, for example, the portion 320 can be a thicker portion of the housing 310 where the recess 315 can accommodate the ferromagnetic panel 330 where the hinge assembly 354 can couple the ferromagnetic panel 330 to the portion 320 of the housing 310. Where the portion 320 is a part of the ferromagnetic panel 330, it can be coupled to the housing 310, for example, via one or more magnets. For example, the ferromagnetic panel 330 can include three sub-panels (e.g., the portion 320 and the sub-panels 334 and 338) that can be provided as a unit that couples to the housing 310, for example, via one or more magnets. In either instance, as illustrated in the bridge position of the device 300 in FIG. 3, the sub-panel 334 can fold over the portion 320 via the hinge assembly 354 and can be held in place via a magnetic attraction force, for example, where the sub-panel 334 and the portion 320 include ferromagnetic materials, which include at least one magnet. As shown, the portion 320 can define part of the back side 313 of the housing 310 where the magnetic surface 314 is made magnetic by the presence of one or more magnets in the portion 320. A magnet can be a permanent magnet and/or an electromagnet.

As shown in FIG. 3, the sub-panel 338 can be angled with respect to the sub-panel 334 via the hinge assembly 358. As an example, the sub-panel 338 can include ferromagnetic material such that it can be magnetically coupled to another component such as, for example, a housing, which may be a display housing, etc.

As shown in FIG. 3, the device 300 can include multiple electrical interfaces 392 and 398. For example, the electrical interface 398 can be provided on a surface of the sub-panel 338 and the electrical interface 392 (shown in dotted lines) can be provided on a surface of the portion 320.

Figure 4:
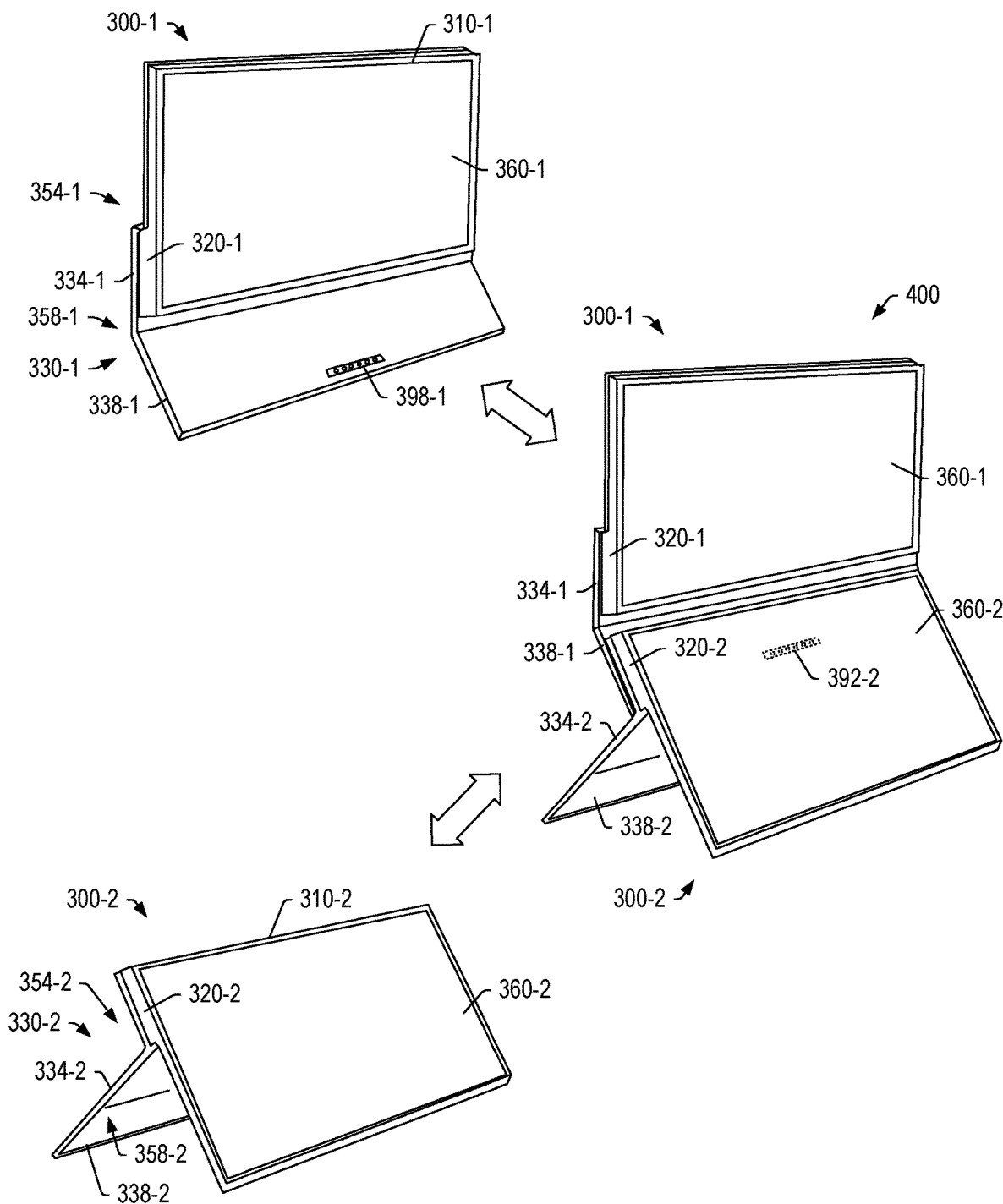
FIG. 4 is a series of perspective view of examples of the device of FIG. 3.

FIG. 4 shows two instances of examples of the device 300, labeled as 300-1 and 300-2, that can be coupled to form the assembly 400. In FIG. 4, the device 300-1 has the ferromagnetic panel 330-1 in the bridge position while the device 300-2 has the ferromagnetic panel 330-2 in the intermediate or kickstand position. As shown, the assembly 400 can be formed by coupling the devices 300-1 and 300-2. In particular, the sub-panel 338-1 of the device 300-1 can be magnetically coupled to the portion 320-2 of the device 300-2. The assembly 400 is shown as including multiple displays 360-1 and 360-2. As shown in FIG. 4, the angle of the display 360-1 with respect to the display 360-2 may be determined via the sub-panel 338-1, for example, as defined by the angle $\beta$.

As explained with respect to FIG. 2B, the display 360-1 may provide a user with ergonomically improved viewing. As an example, a user may utilize the display 360-1 as a main display and the display 360-2 as a secondary display. In such an example, one or both of the displays 360-1 and 360-2 can be touch screen displays. For example, consider a user that can touch one or more graphical user interfaces (GUIs) rendered to the display 360-2 that may include one or more menus, control graphics, etc., to control rendering of information to the display 360-1. For example, consider video rendering to the display 360-1 and control graphics rendering to the display 360-2 that can be actuated to control the video rendering to the display 360-1.

In the example of FIG. 4, as shown with respect to the assembly 400, the electrical interface 398-1 of the device 300-1 can be electrically coupled to the electrical interface 392-2 (shown in dotted lines) of the device 300-2. For example, the electrical interface 392-2 can be on a back facing surface of the portion 320-2 such that it can mate with the electrical interface 398-1 on the front facing surface of the sub-panel 338-1 of the device 300-1 as shown in the upper left portion of FIG. 4; noting that in the lower left portion of FIG. 4, such an electrical interface of the device 300-2 would be facing backwardly.

Figure 5:
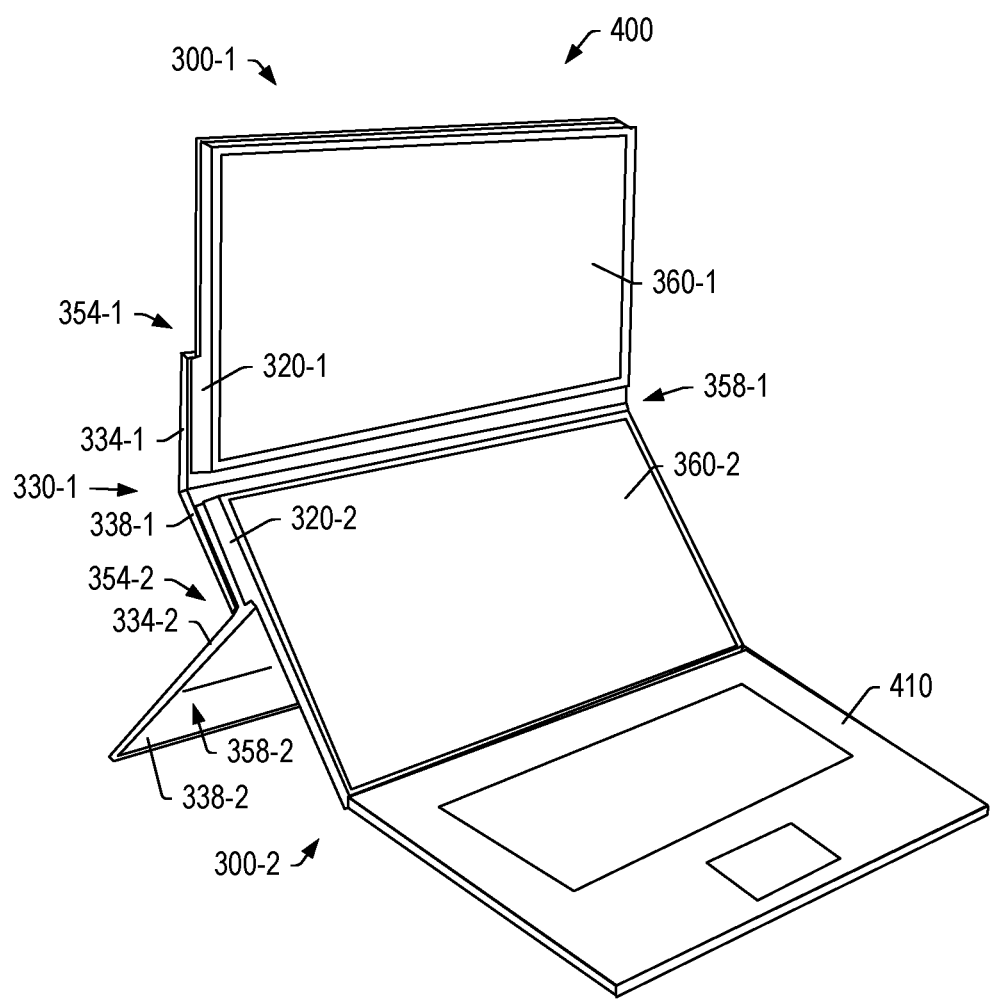
FIG. 5 is a perspective view of the examples of the device of FIG. 4 and an example of a keyboard.

FIG. 5 shows an example of the assembly 400 of FIG. 4 along with a keyboard 410. For example, the device 300-2 may be operatively coupled to the keyboard 410 for receipt of input. As an example, the keyboard 410 may be a wired and/or wireless keyboard. A wired keyboard may include a cable with a connector, an electrical interface (e.g., pogo-pins, etc.), or a combination thereof. A wireless keyboard can include wireless communication circuitry such as, for example, BLUETOOTH wireless communication circuitry.

In the examples of FIG. 4 and FIG. 5, the devices 300-1 and 300-2 may be operable independently and/or dependently. For example, consider the device 300-1 being utilized for one purpose via execution of one or more applications in an operating system environment established using a processor and memory of the device 300-1 while the device 300-2 is being utilized for another purpose via execution of one or more applications in an operating system environment established using a processor and memory of the device 300-2. Or, for example, consider the device 300-2 as being a main device that controls rendering of information to the display 360-1 of the device 300-1 via execution of one or more applications in an operating system environment established using a processor and memory of the device 300-2. In such an example, the devices 300-1 and 300-2 may be operatively coupled in a wired and/or wireless manner (e.g., as to wired, consider the electrical interfaces 398-1 and 392-2).

As an example, the device 300-1 may be utilized with a notebook device such as, for example, a SURFACE PRO device (Microsoft Corporation) or another type of notebook device (e.g., clamshell device). The bridge position of the ferromagnetic panel 330-1 provides for attachment to another display device via a magnetic attraction force. Such an approach can readily provide a user with a display, which may be utilized as a main display, an auxiliary display, etc.

In the examples of FIG. 4 and FIG. 5, the angle of the displays 360-1 and 360-2 may be adjustable. For example, the hinge assembly 358-1 may provide for adjusting the angle of the display 360-1 with respect to the display 360-2 and the hinge assembly 354-2 may provide for adjusting the angle of the display 360-2. In the examples of FIG. 4 and FIG. 5, the display 360-1 is elevated above the display 360-2 and at an approximately 90 degree angle with respect to a support surface (e.g., tabletop, desktop, countertop, etc.).

Figure 6:
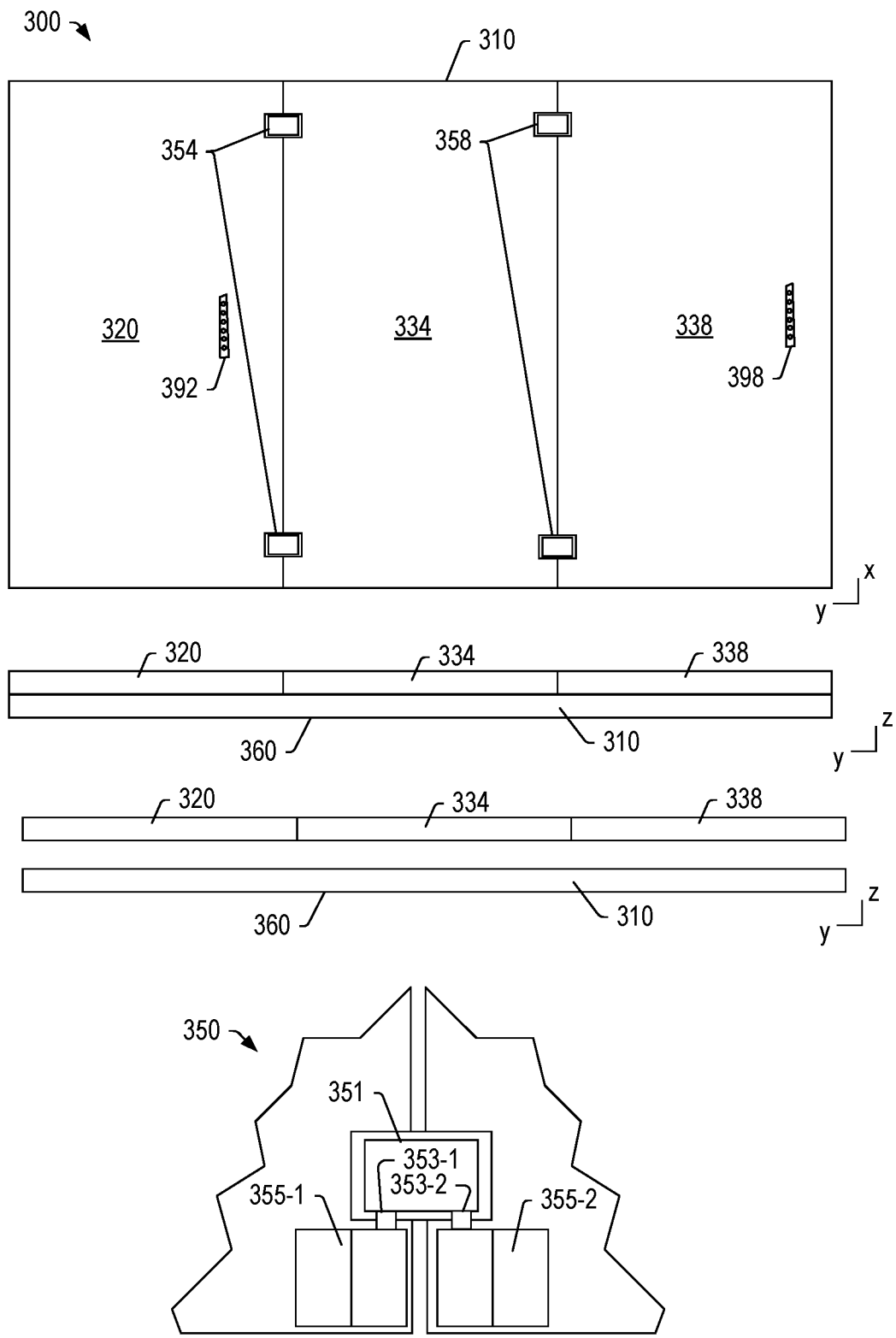
FIG. 6 is a series of views of an example of the device of FIG. 3 and an example of a hinge assembly.

FIG. 6 shows various views of an example of the device 300 including a plan view, a side view, a decoupled side view and a plan view of an example of a hinge 350. FIG. 6 also shows a Cartesian coordinate system (x, y and z) that may be used to define and/or describe one or more features of the device 300. For example, the portion 320 and the sub-panels 334 and 338 can be defined as having lengths along a y coordinate, widths along an x coordinate and thicknesses along a z coordinate. As an example, the portion 320 and the sub-panels 334 and 338 can be approximately the same as to length, width and thickness. As explained, the portion 320 may be integral to the housing 310 or may be separate and attachable to the housing 310. In the decoupled side view, the portion 320 and the sub-panels 334 and 338 may be a sub-assembly, for example, coupled by hinge assemblies 354 and 358. Where the portion 320 is integral to the housing 310, the hinge assembly 354 can provide for coupling of the sub-panel 334, which is coupled to the sub-panel 338 via the hinge assembly 358.

As an example, a hinge assembly can include one or more hinge assemblies. For example, consider the hinge assembly 350, which can include a coupling 351, axles 353-1 and 353-2 and leafs 355-1 and 355-2. In such an example, the coupling 351 can include one or more gears such that the hinge assembly 350 is a synchronous hinge. A synchronous hinge can be a dual-axle hinge where the axles rotate synchronously. Such a hinge can provide for a flat, planar orientation (e.g., 180 degree position) and a folded orientation (e.g., a 0 degree position). As an example, such a hinge may provide for another folded orientation (e.g., 360 degree position).

As an example, a hinge assembly may be a single piano type of hinge that extends a distance definable along the y coordinate axis. In such an example, leaves of the piano type of hinge can be attached to components with an exposed barrel portion that receives a pin (e.g., an axle, etc.). In such an example, one or more spacers (e.g., bumpers, etc.) may be utilized to accommodate the barrel portion when the piano type of hinge is in an approximately 180 degree position (e.g., consider a top board hinge in a cover of a grand piano, etc.).

Figure 7:
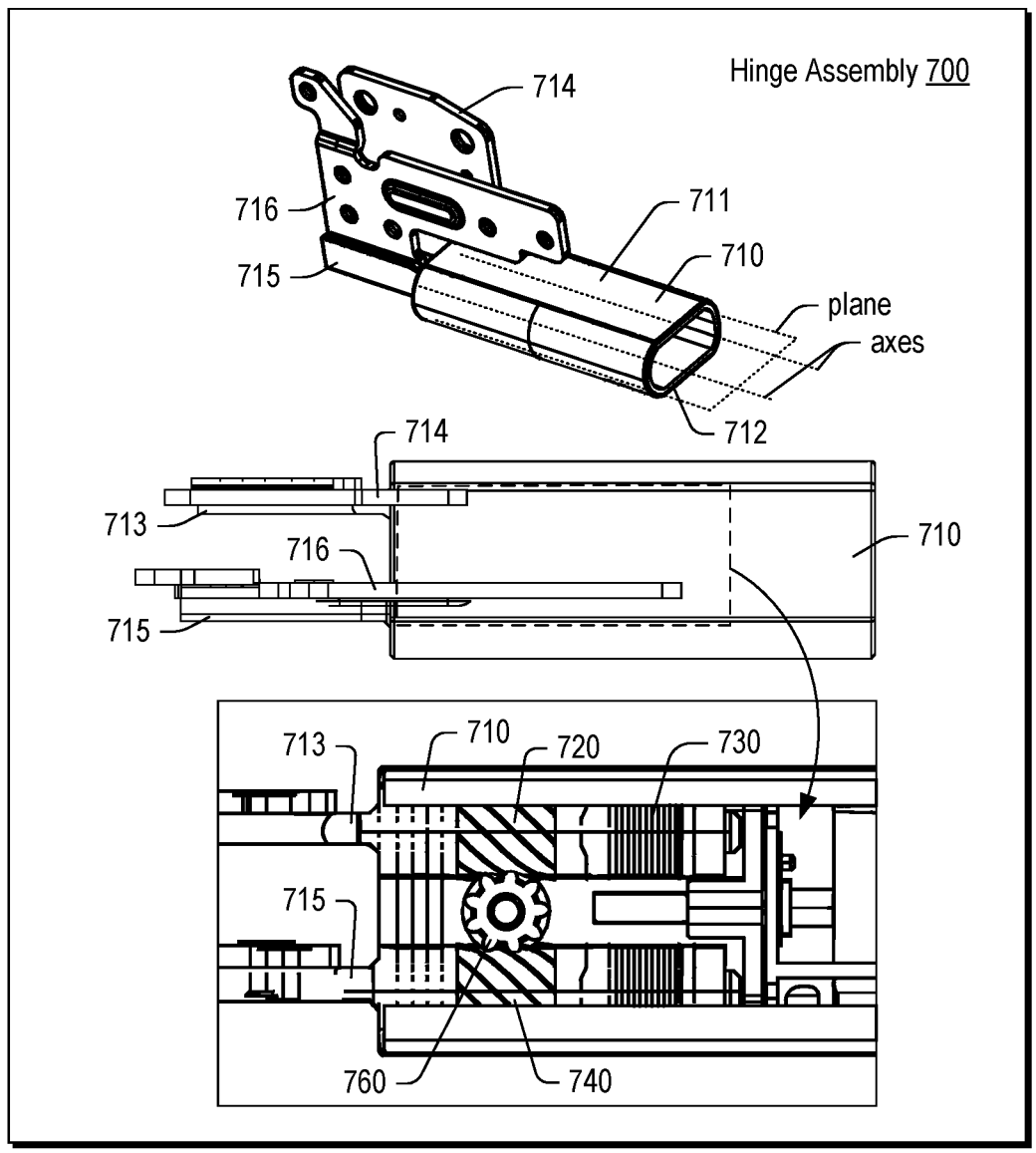
FIG. 7 is a series of views of examples of hinge assemblies.
Figure 7:
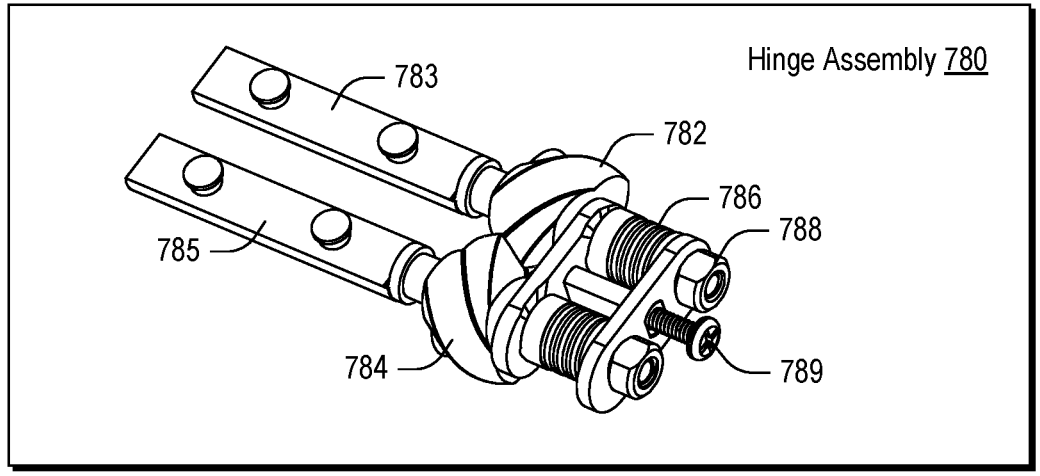

FIG. 7 shows an example of a hinge assembly 700 and an example of a hinge assembly 780. As an example, the hinge assembly 350 may include features of the hinge assembly 700 and/or the hinge assembly 780.

As shown in FIG. 7, the hinge assembly 700 includes a housing 710 with opposing sides 711 and 712, axles 713 and 715 with corresponding axes, saddles 714 (coupled to the axle 713) and 716 (coupled to the axle 715), gears 720, 740 and 760 and a tensioning mechanism 730 (e.g., a stack of coned washers, etc.). In the hinge assembly 700, the gear 760 is an intermediate gear that is disposed between the gears 720 and 740. As shown, the intermediate gear 760 has a rotational axis that is orthogonal to the rotational axes of the gears 720 and 740. In such an example, the intermediate gear 760 can allow for spacing of axles 713 and 715.

In the example of FIG. 7, the saddles 714 and 716 (e.g., leafs) can be operatively coupled to respective portions of a device such that the portions can be oriented from an approximately 0 degree folded orientation to an approximately 180 degrees flat, planar orientation.

In FIG. 7, the hinge assembly 780 includes gears 782 and 784, axles 783 and 785, a tension mechanism 786, nuts 788 and a tensioning component 789. As an example, the hinge assembly 780 may include a housing such as the housing 710.

As an example, a hinge assembly can include two or more gears. As an example, a hinge assembly can include two or more axles. As an example, a hinge assembly can include two or more gears and two axles that have rotational axes that are substantially parallel to each other where each of the two axles is operatively coupled to a respective portion of a device.

FIG. 7 shows the hinge assembly 700 as including substantially parallel rotational axes of the two axles 713 and 715 that can define a plane (see dashed lines and labels). In the example hinge assembly 700 of FIG. 7, the housing 710 includes a tubular shape, which may be described as being a flattened tube where the opposing sides 711 and 712 are substantially flat, opposing and parallel sides joined by rounded ends. In such an example, the substantially flat, opposing and parallel sides 711 and 712 can be substantially parallel to either side of a plane defined by the axles 713 and 715. Where the housing 710 is in a stationary coordinate system, the saddles 714 and 716 may be rotated about the respective axes of the axles 713 and 715, for example, from an orientation as shown in FIG. 7 to another orientation where each of the saddles 714 and 716 has been rotated approximately 180 degrees, the saddle 716 being rotated counter-clockwise and the saddle 714 being rotated clockwise when viewing the housing 710 from the open end shown in FIG. 7. As an example, a hinge assembly can be a friction hinge assembly that may be without one or more lock points along its rotation. For example, a hinge assembly can have a variable 360 degree rotation with a set specified torque that meets specification as to ergonomics for a user.

Figure 8:
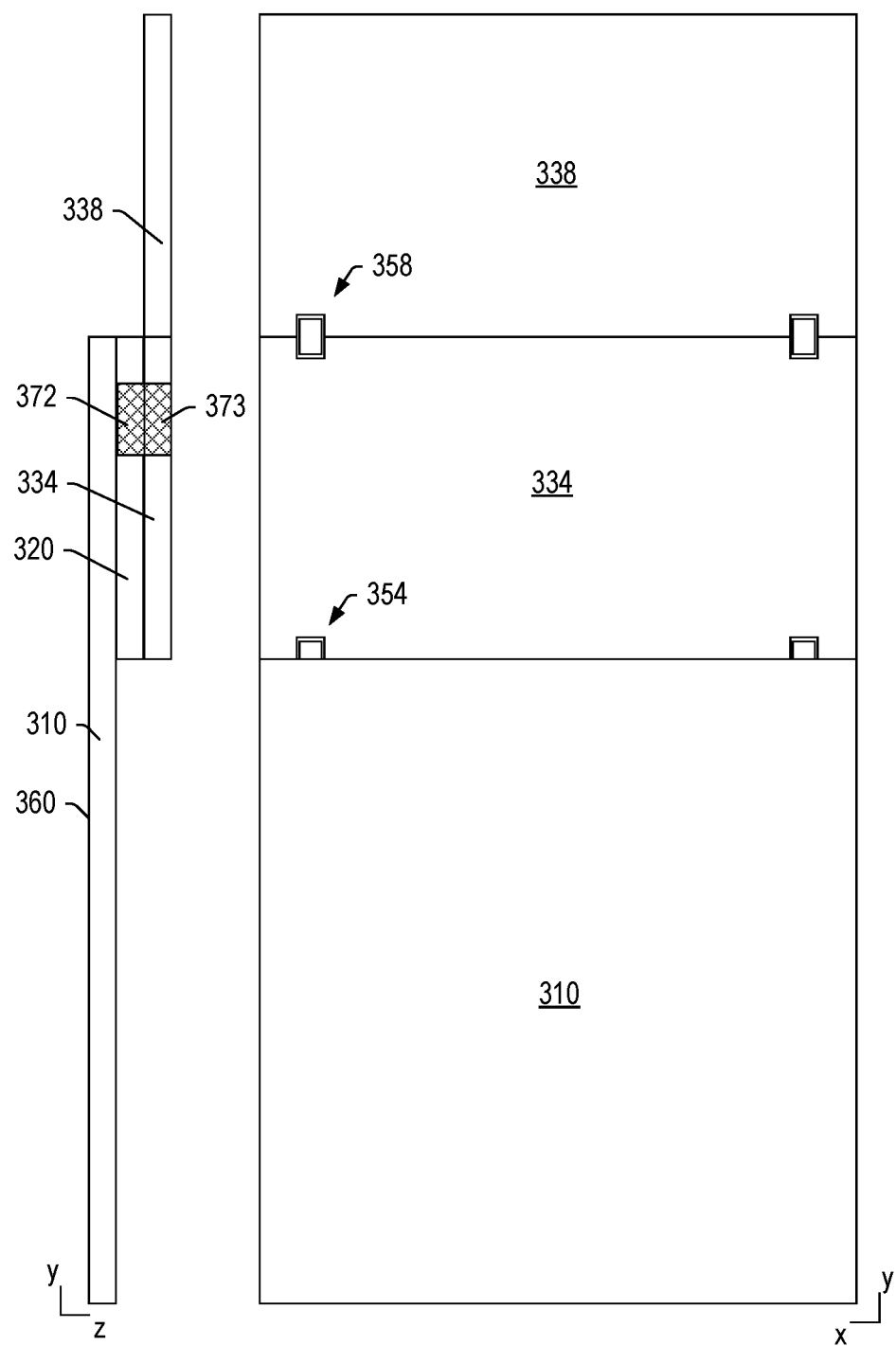
FIG. 8 is a side view and a plan view of an example of a device.

FIG. 8 shows a side view and a plan view of an example of the device 300 where the portion 320 and the sub-panel 334 include ferromagnetic materials 372 and 373 that include at least one magnetic material. For example, consider the materials 372 and 373 as each including permanent magnetic material (e.g., permanent magnets). In such an example, the portion 320 and the sub-panel 334 can be held in position by a magnetic attraction force. As explained, the sub-panel 338 can include ferromagnetic material, for example, to provide for coupling to another device.

Figure 9:
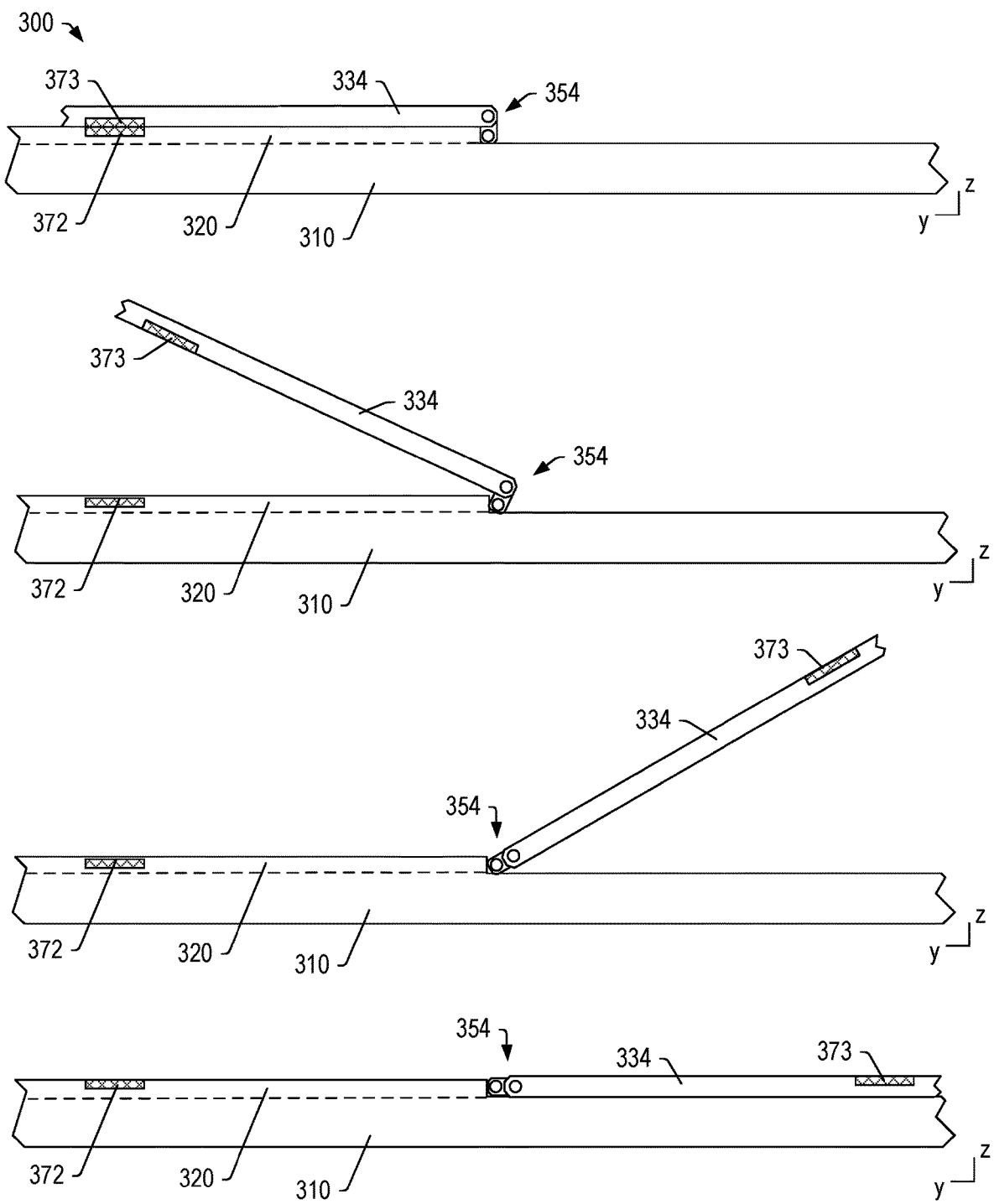
FIG. 9 is a series of side views of a portion of an example of a device.

FIG. 9 shows a portion of an example of the device 300 where the hinge assembly 354 can be a synchronous hinge assembly that provides for a folded orientation of the portion 320 and the sub-panel 334 (e.g., 0 degrees, top) and a flat, planar orientation of the portion 320 and the sub-panel 334 (e.g., 180 degrees, bottom). As an example, a panel may have a thickness that is in a range from approximately 2 mm to approximately 5 mm and a hinge assembly may have a thickness (e.g., in the 180 degree position) that is approximately double the panel thickness (e.g., from approximately 4 mm to approximately 10 mm or more).

Figure 10:
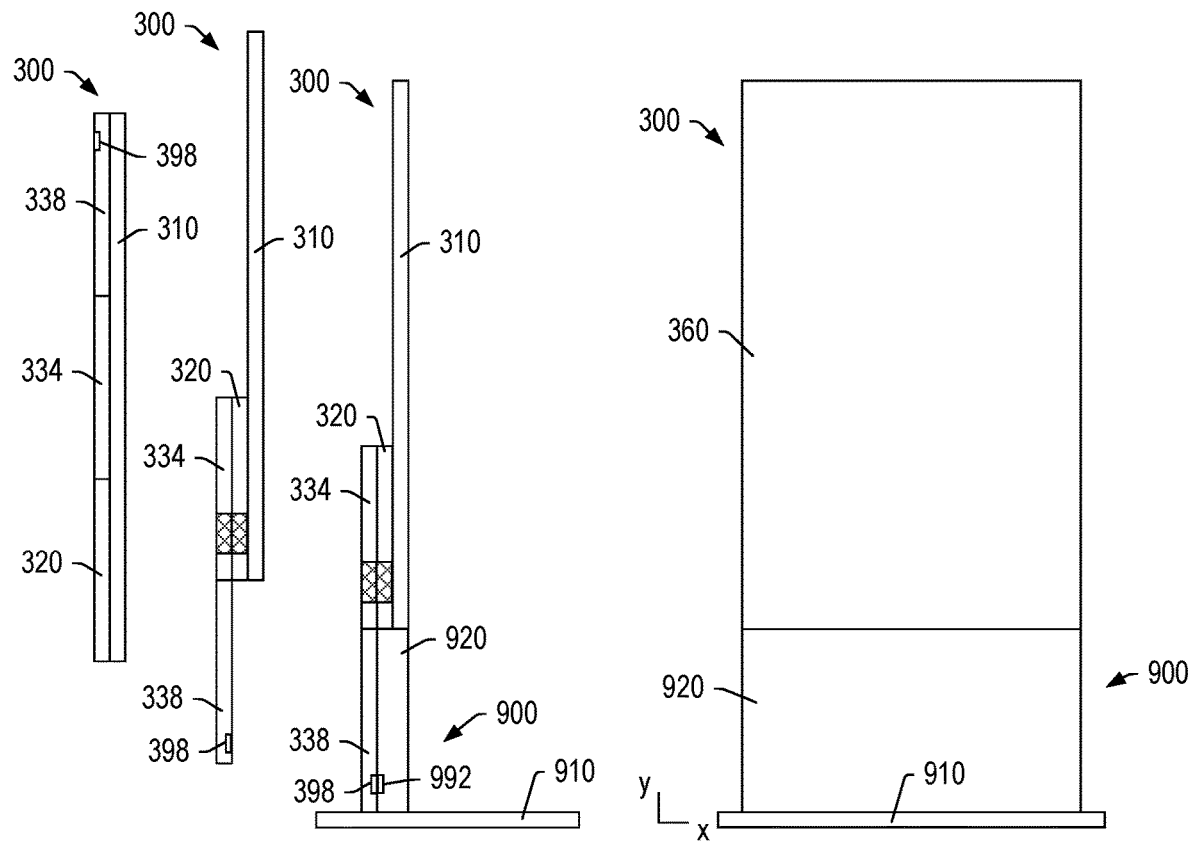
FIG. 10 is a series of views of an example of a device along with an example of a stand.
Figure 10:
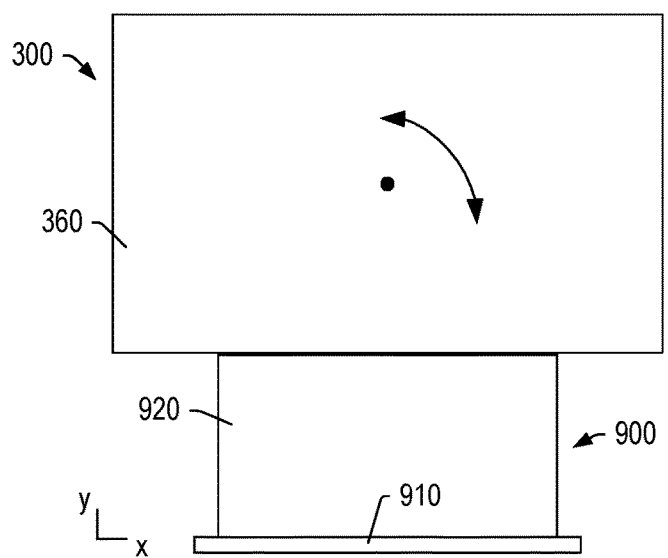

FIG. 10 shows an example of the device 300 being coupled to a stand 900, which can include a base 910 and an upright member 920. As shown, the device 300 can be coupled to the stand 900 via the sub-panel 338. For example, the upright member 920 can include ferromagnetic material that can form a magnetic attraction force with ferromagnetic material of the sub-panel 338 where such ferromagnetic materials include at least one magnetic material. As shown in the example of FIG. 10, the device 300 can include the electrical interface 398 and the stand 900 can include an electrical interface 992 where the electrical interfaces 398 and 992 can mate to electrically couple circuitry of the device 300 and circuitry of the stand 900. As an example, one or more magnets may provide for positional registration of the electrical interfaces 398 and 992.

As an example, the display 360 of the device 300 may be positionable such as being rotatable. For example, consider the display 360 being part of the housing 310 where the housing 310 can be rotated, with or without decoupling from the portion 320, which, as mentioned, may be separable from the housing 310. In such an example, the housing 310 can include ferromagnetic material such that it can be coupled to the portion 320 in a portrait or a landscape orientation.

In the example of FIG. 10, the stand 900 may provide a vertical space (e.g., a clearance) that can accommodate a tablet device, a laptop computing device, etc., below a lower edge of the device 300.

Figure 11:
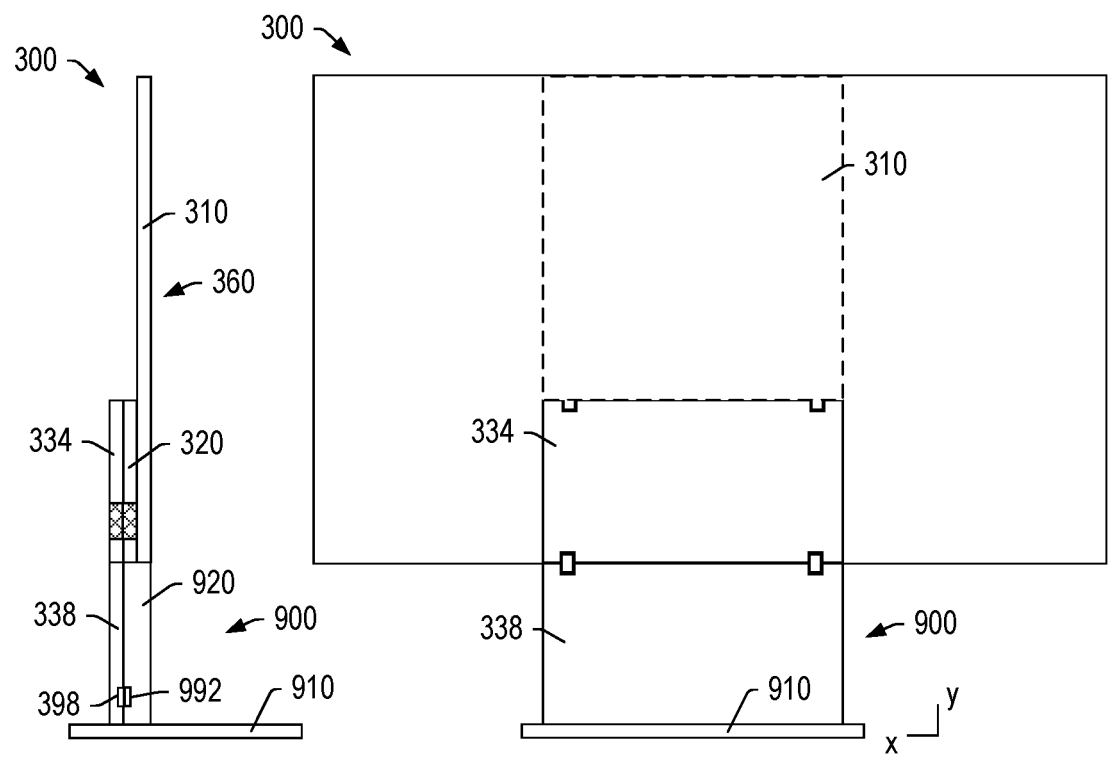
FIG. 11 is a series of views of an example of a device along with an example of a stand.
Figure 11:
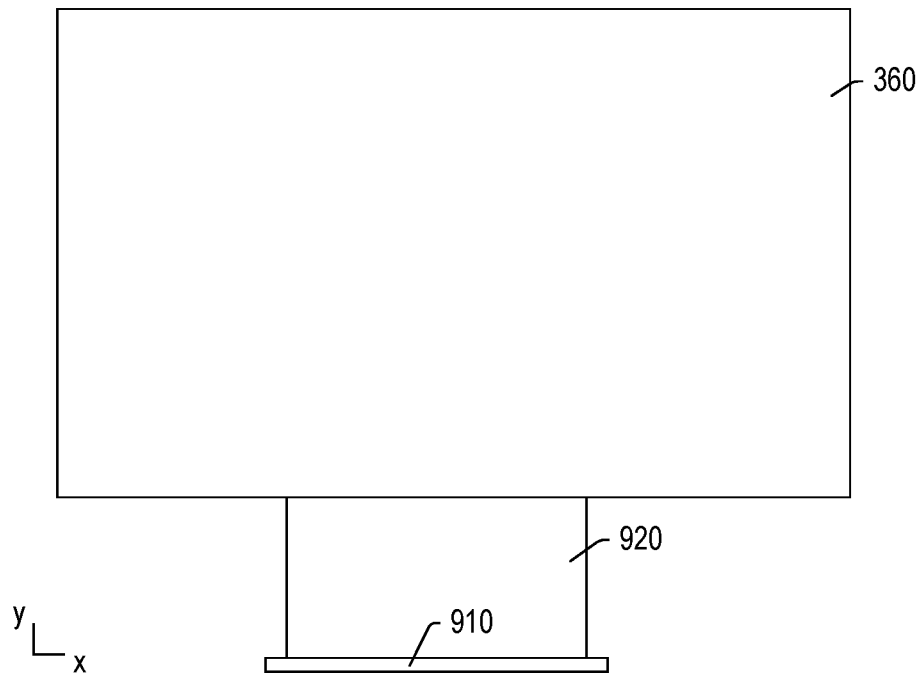

FIG. 11 shows an example of the device 300 as being coupled to the stand 900 where the display 360 of the device 300 is larger than the width of the sub-panels 334 and 338.

Figure 12:
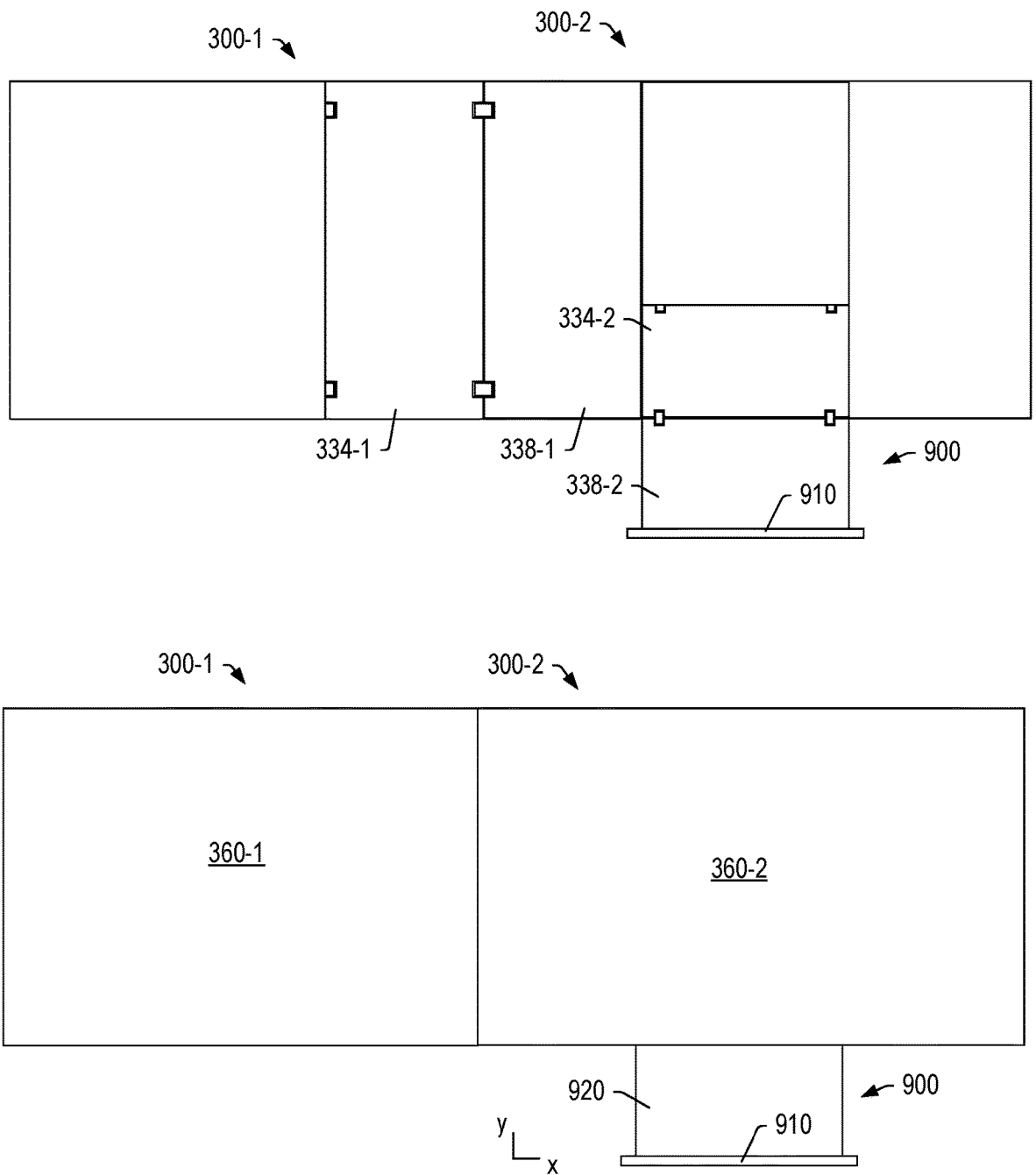
FIG. 12 is a back side view and a front side view of examples of devices along with an example of a stand.

FIG. 12 shows examples of the device 300 as devices 300-1 and 300-2, which can be coupled together where the device 300-2 may be coupled to the stand 900. In FIG. 12, the device 300-2 can, as explained with respect to FIG. 11, have its display 360-2 being wider than the width of its sub-panels 334-2 and 338-2.

Figure 13:
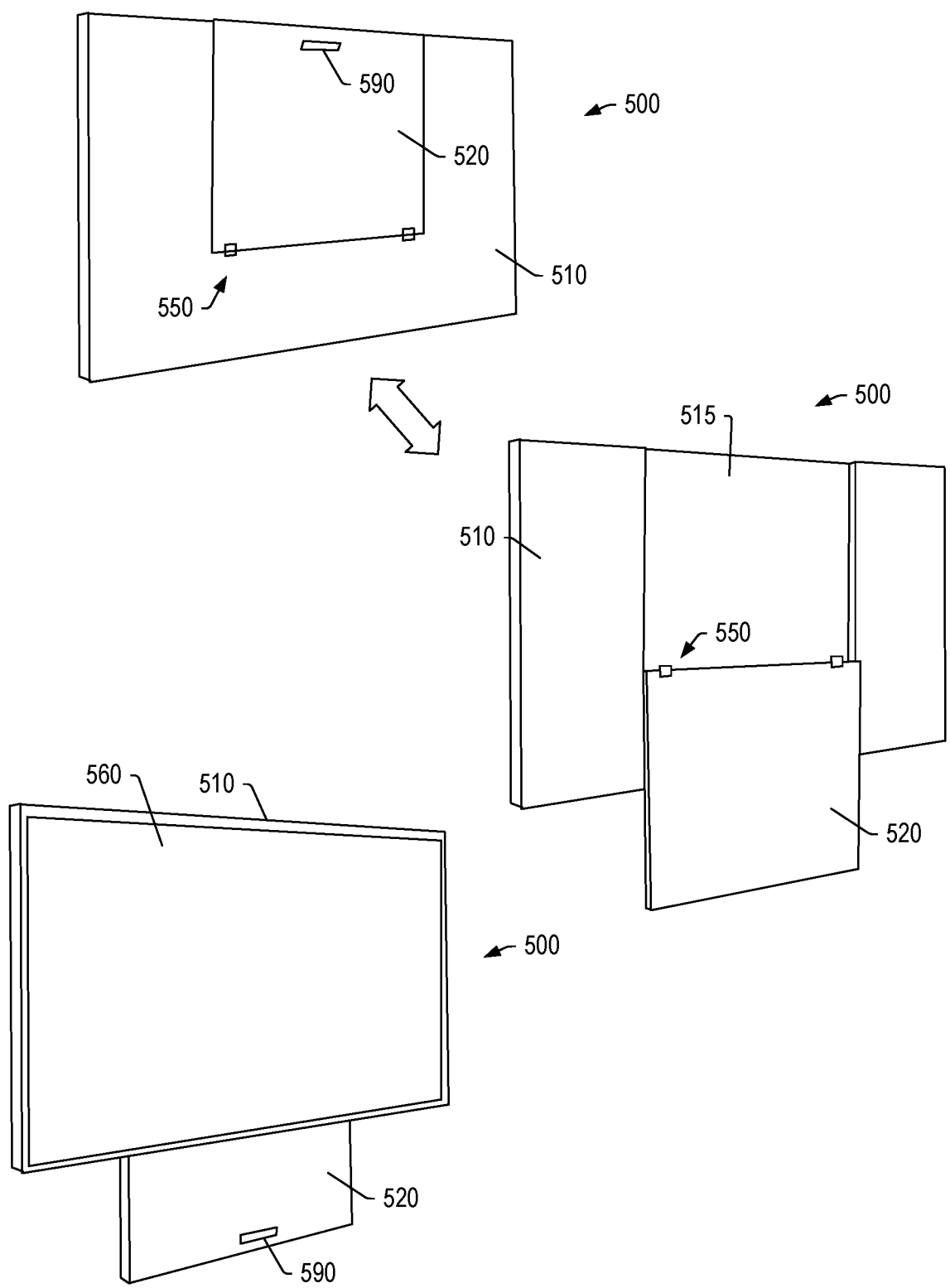
FIG. 13 is a series of perspective views of an example of a device.

FIG. 13 shows an example of a device 500 that includes a housing 510, a recess 515, a panel 520, a hinge assembly 550 and a display 560. As shown, the panel 520 can be coupled to the housing 510 via the hinge assembly 550 where the panel 520 can be seated in the recess 515 and rotated out of the recess 515 by an angle of approximately 180 degrees. In such an example, the hinge assembly 550 can include one or more features of the hinge assemblies 700 and 780 of FIG. 7. As shown, the device 500 can include an electrical interface 590 that may be utilized to couple circuitry of the device 500 to circuitry of another device (e.g., a stand, etc.).

Figure 14:
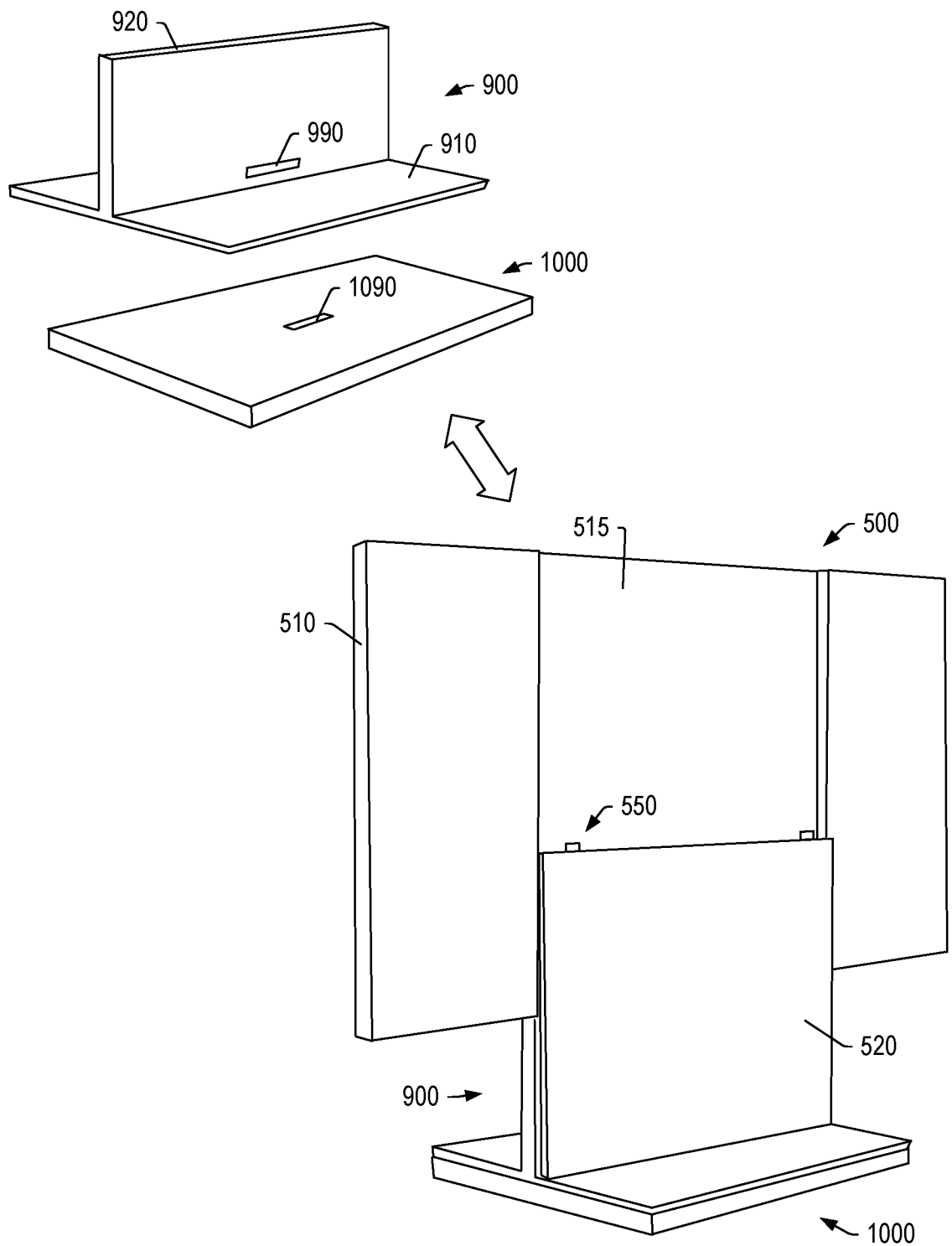
FIG. 14 is a series of perspective views of an example of a device, an example of a stand and an example of an accessory device.

FIG. 14 shows an example of the stand 900, an example of an accessory device 1000 and an example of the device 500 as being coupled to the stand 900 where the stand 900 is coupled to the accessory device 1000. In such an example, the accessory may be a computing device that can be operatively coupled to the device 500, for example, to render information to the display 560 of the device 500 and/or to receive input via the display 560 of the device 500 (e.g., consider a touch screen display, etc.). As an example, the device 500, the stand 900 and/or the accessory device 1000 may couple in a wired and/or wireless manner (e.g., via one or more cables, interfaces, wireless circuits, etc.). For example, consider the electrical interfaces 590 and 990 being electrically coupled (e.g., mated) to electrically couple circuitry of the device 500 and circuitry of the stand 900, which may electrically couple to circuitry of the accessory device 1000. For example, consider a bottom electrical interface of the stand 900 electrically coupling to a top electrical interface 1090 of the accessory device 1000. As an example, one or more magnets may be utilized for positional registration of one or more of the device 500, the stand 900 and/or the accessory device 1000.

Figure 15:
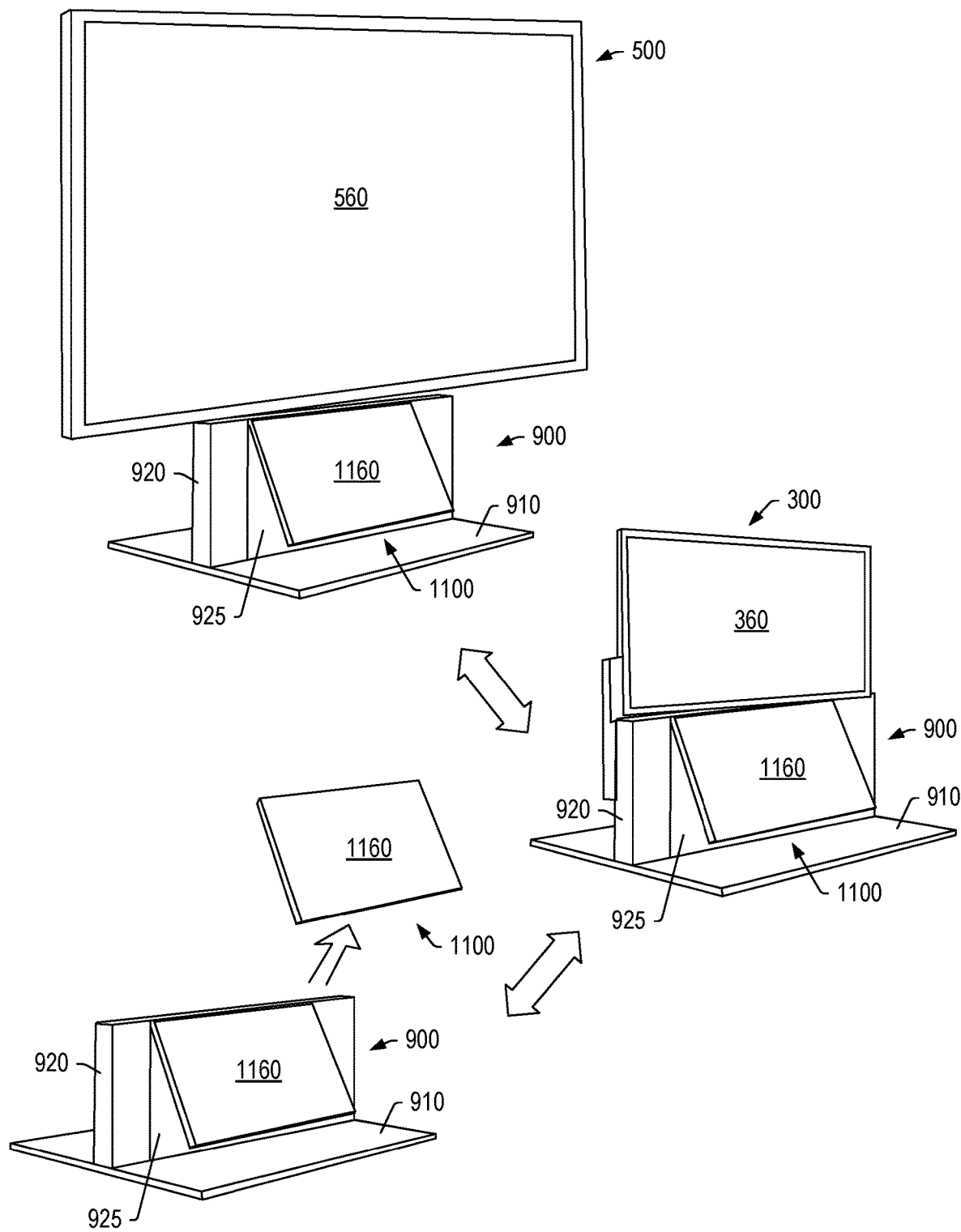
FIG. 15 is a series of perspective views of examples of devices.

FIG. 15 shows an example of the device 500 as being coupled to the stand 900 where the stand 900 supports a tablet device 1100 that includes a display 1160 and shows an example of the device 300 as being coupled to the stand 900 where the stand 900 supports the tablet device 1100. In the example of FIG. 15, the stand 900 may include a recess 925 in the upright member 920 that can provide for seating of the tablet device 1100. As an example, a support may be provided (e.g., a hinged support, etc.) that can provide for positioning the tablet device 1100 with respect to the stand 900. For example, consider a hinged panel with a lower lip where the tablet device 1100 can be seated against the lower lip and where the hinged panel can be rotated via a top side hinge assembly that couples the hinged panel to the upright member 920 of the stand 900. FIG. 15 shows how the stand 900 can support multiple devices, optionally to provide a user with multiple displays.

Figure 16:
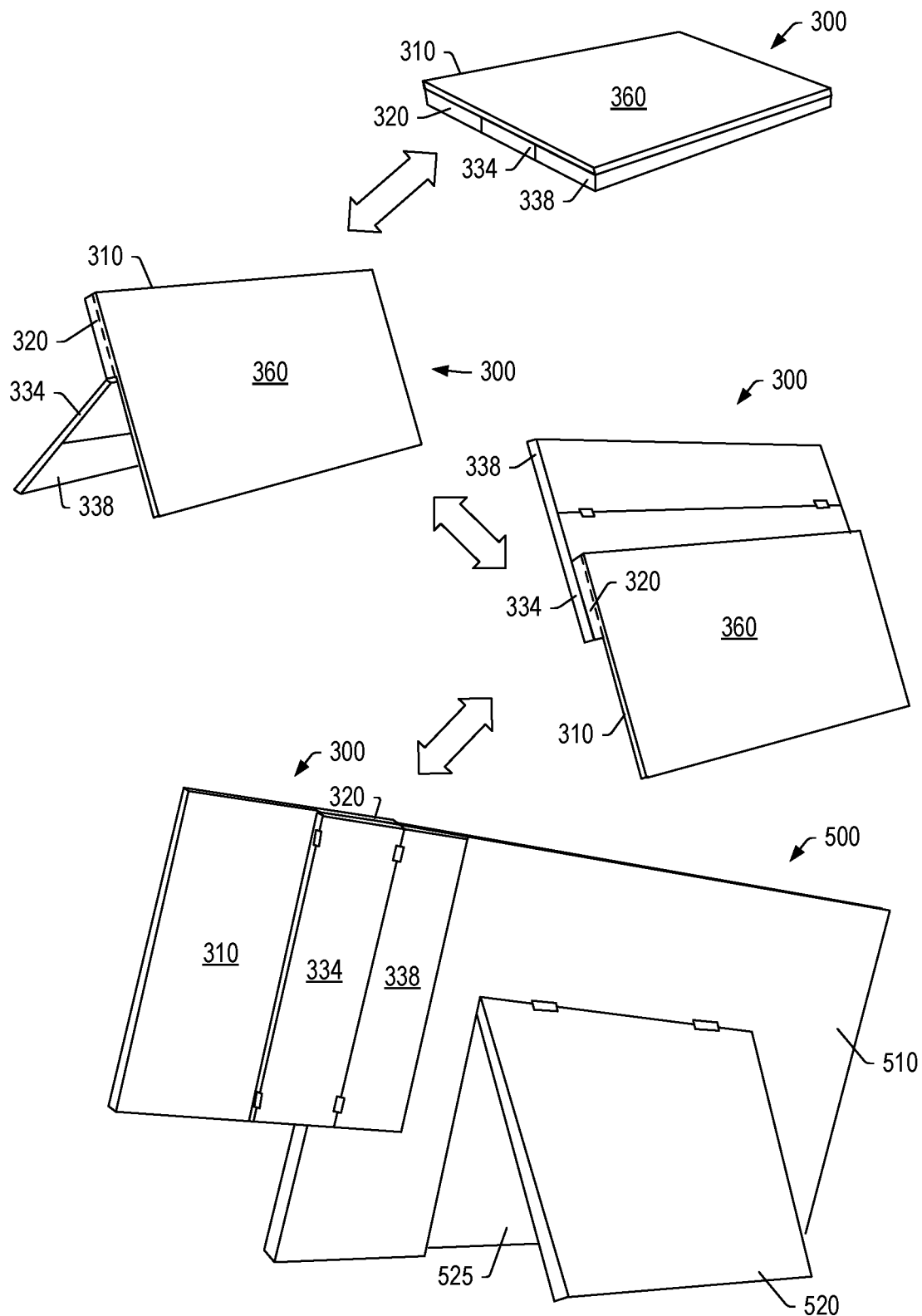
FIG. 16 is a series of perspective views of examples of devices.

FIG. 16 shows an example of the device 300 as being coupled to an example of the device 500 where the device 500 may be supported by the panel 520 being disposed at an angle such as a kickstand angle. In such an example, the display 560 of the device 500 is flipped by 180 degrees from the example of FIG. 13, FIG. 14 and FIG. 15. As shown, the sub-panel 338 can provide for coupling the device 300 to the device 500 where each can include one or more ferromagnetic materials that can provide a magnetic attraction force.

Figure 17:
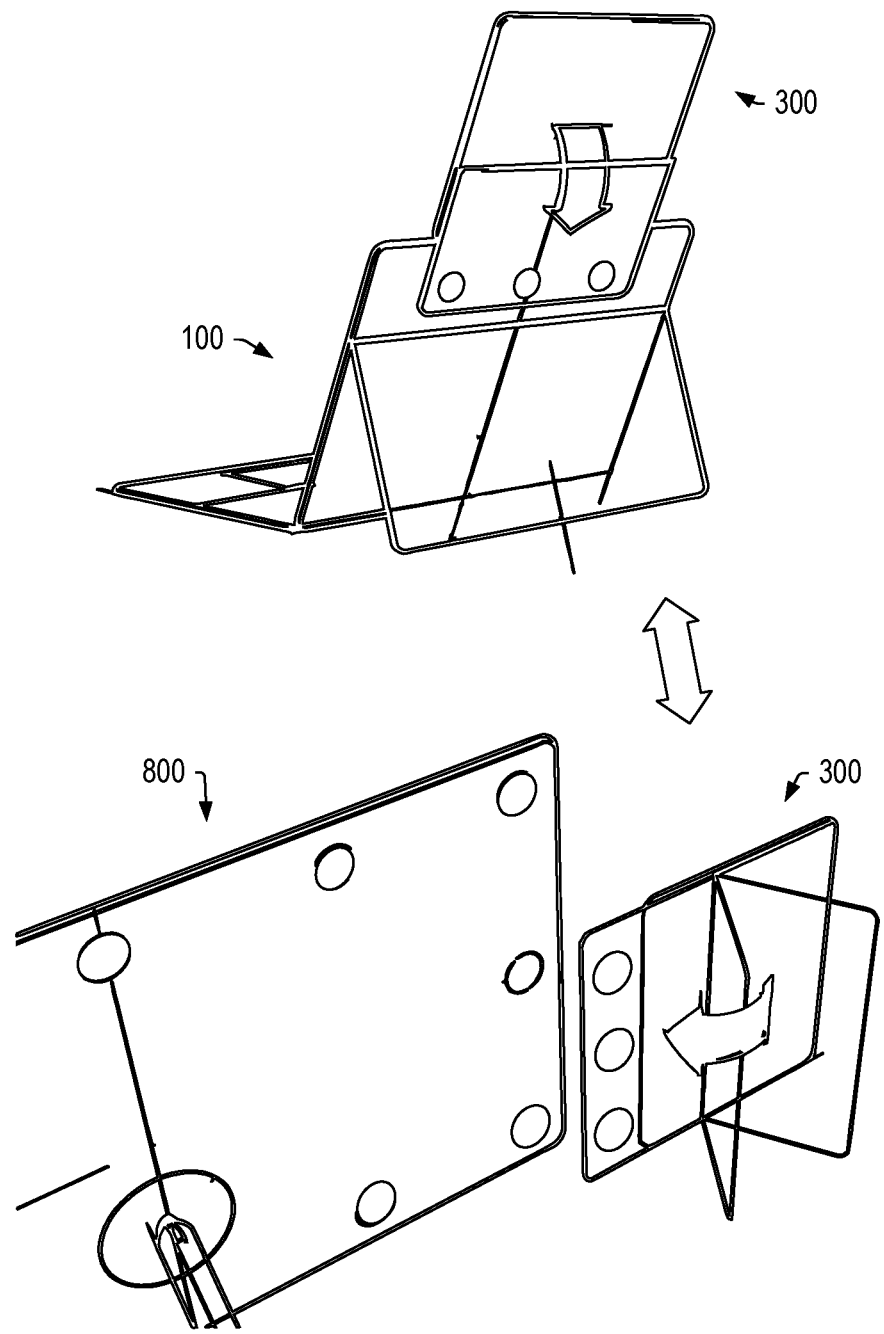
FIG. 17 is a series of perspective views of examples of devices.

FIG. 17 shows an example of the device 300 being couples to a computing device 100 and an example of the device 300 being coupled to a display device 800. In FIG. 17, circles represent ferromagnetic materials that can provide for magnetic coupling of the devices 100, 300 and 800. In the example of FIG. 17, the display device 800 may optionally be an all-in-one (AIO) device that includes at least one processor and memory.

Figure 18:
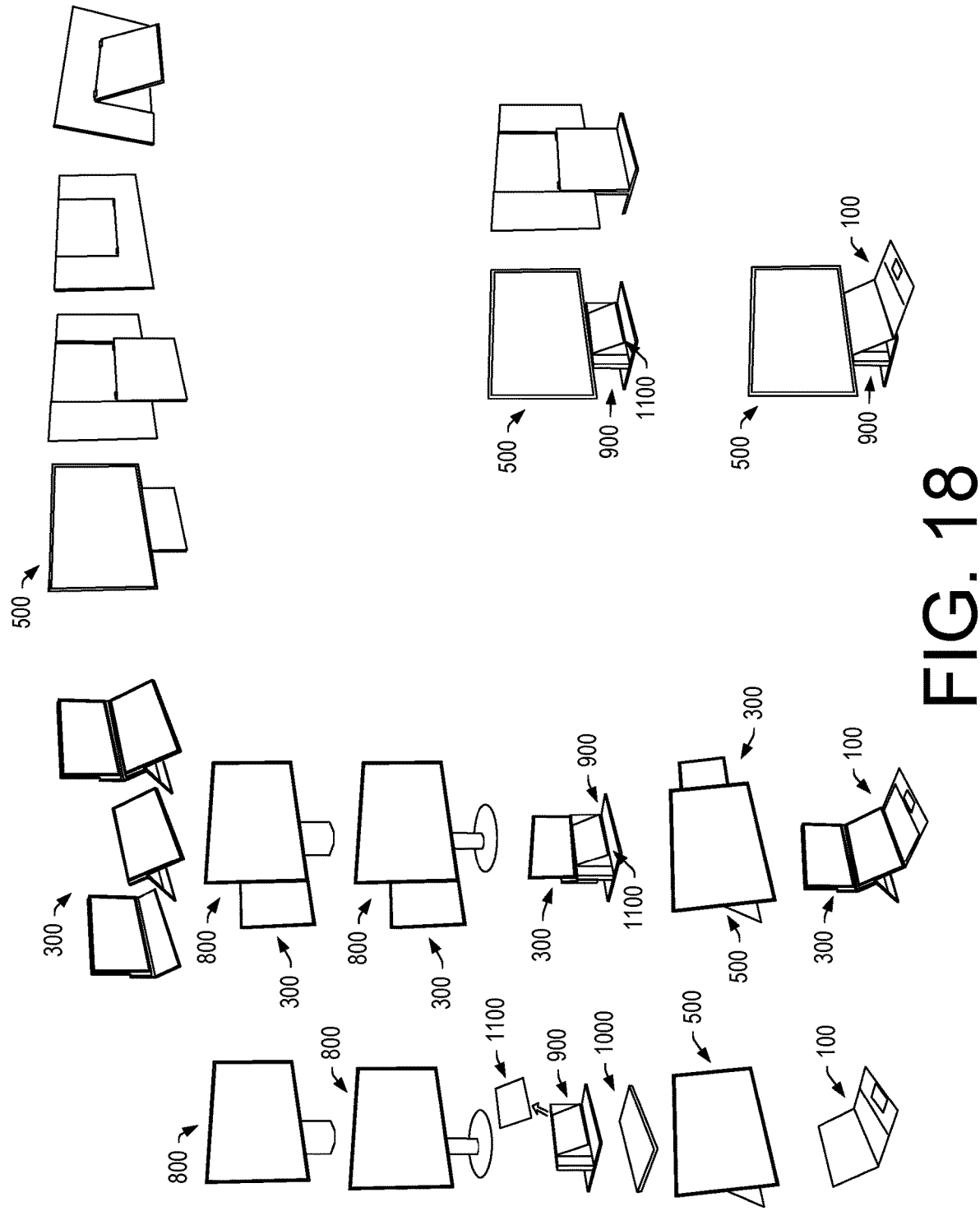
FIG. 18 is a series of perspective views of examples of devices.

FIG. 18 is a composite view of various examples of devices 100, 300, 500, 800, 900, 1000 and 1100 in various arrangements, some of which provide for increased display area. For example, the device 300 can be a display device that can be utilized with one or more other devices (e.g., different type or types of devices) and/or with multiples of the device 300. As to some examples, consider bridging two or more instances of the device 300 with each other to provide increased display area or bridging two or more instances of the device 300 on to another type of display device (e.g., left side and right side instances of the device 300 bridged to a central display device, etc.).

As explained, a device can include a housing with a front side display and a back side that includes a ferromagnetic surface (e.g., one or more permanent magnets, material attracted to one or more permanent magnets, etc.), a hinge assembly and a recess along with a ferromagnetic panel transitionable via the hinge assembly from a storage position in the recess to a bridge position that covers the ferromagnetic surface. In such an example, for the bridge position, a magnetic attraction force can hold the ferromagnetic panel in place with respect to the housing and, for example, allow the device to be coupled to another device, which may be another instance of the device, a display device, a notebook computer, etc. Such coupling or bridging can be via a magnetic attraction force between a portion of the ferromagnetic panel and the other device. For example, the device and the other device can include one or more permanent magnets that provide for coupling via a magnetic attraction force. As explained, via bridging, a display area may be effectively enlarged (e.g., via the display of the device and a display of the other device).

Having a second display can facilitate user multi-tasking (e.g., spreadsheets, slides, e-mail, etc.), user design content creation (e.g., photo editing, video editing, etc.) and applications that can include multiple menu layouts such as digital audio workstations (DAW), etc. A vast range of professions, hobbyist and communications can drive application development. As explained, hardware such as a bridge device can further drive application development and/or augment existing hardware.

In various instances, a user may desire a so-called "clean" desk as opposed to a cluttered desk. An approach that utilizes two side-by-side display devices, each with its own stand, can add to clutter. In contrast, a bridging approach can involve utilizing a display device or display housing of a device for support (e.g., without having to add another stand). In various examples, one or more types of electrical interfaces can be included such that such interfaces mate, for example, via magnetic attraction force between a panel of one device and a surface of another device.

As an example, a clean desk approach may involve providing a relatively minimalistic and organized work surface/space as well as improved ergonomics. A clean desk approach can translate to working more efficiently, feeling comfortable with a space, easier to clean surfaces, etc. Further, when a user is on-camera for live events and recordings, such a user may desire a professional looking space.

As an example, a bridgeable device can help to reduce the number of cables and devices/cover-cases on a desk to free up a work surface, provide a cleaner, simpler looking workspace aesthetic, improve ergonomics, and improve organization.

In various instances, a large portion of available workspace is occupied by a display. A display tends to be the focus of a user's eyes and extraneous items strewn about the display tend to be distracting. A second display, used to increase available display area of a first display, find use in various circumstances. For example, a second display may be utilized at a workstation, on a tabletop, a countertop, etc. Second displays are finding increasing use in coffee shops, airports, hotels, etc., where a user is out of home and out of the office. A home or office setup may include, for example, two 24 or 27 inch display devices (e.g., approximately 61 cm or approximately 69 cm) standing adjacently side by side where the display devices are generally static, remaining in place and not transported (e.g., due to inconvenience, risk of damage, etc.).

As an example, a ferromagnetic panel can be part of a device (e.g., integral or attachable) and utilized for one or more purposes. For example, it may be utilized as a kickstand or it may be utilized for bridging the device to another device. In such an example, the ferromagnetic panel can be a bridge that will allow the device to attach to another identical device, travel display device, a laptop computing device, a primary larger display device, etc. Such a multiple-display approach can be effectuated in a "clean" desk manner, for example, reduced cords and fewer freestanding devices taking up desk surface real estate. As an example, a device may bridge to another device where, for example, depending on features, displays can be aligned as desired (e.g., for optimum ergonomic viewing, etc.).

As explained, a ferromagnetic panel can be variably adjusted to a desired angle with respect to a housing, for example, using a friction hinge for support at the particular, desired angle. In such an example, the ferromagnetic panel can be utilized to tilt the housing back at an angle of approximately 40 degrees off vertical and, for example, may provide to tilt the housing back at approximately 120 degrees when using a stylus for drawing. As explained, for bridging, a ferromagnetic panel may be coupled to the housing via a fiction hinge assembly capable of rotating by approximately 180 degrees where the housing would be substantially parallel to the folded back ferromagnetic panel. In such an orientation, the ferromagnetic panel can protrude beyond and end of the housing, for example, by a distance of approximately one-third of an end to end span of the housing (e.g., landscape height, etc.) as may be determined by where the hinge assembly is positioned. In such a one-third extension of the ferromagnetic panel beyond the housing, the ferromagnetic panel provides a surface to attach to the back of another device (e.g., a primary large display, another instance of the device, a laptop computing device, etc.).

As explained, one or more magnets may be utilized (e.g., one or more permanent magnets), which may reduce set-up time and provide a "clean" experience. In such an example, magnetic attraction force can provide for quick positional registration between devices where, for example, contact interfaces (e.g., pogo pins, plates, etc.) can be aligned for connectivity, optionally without utilization of a cable.

As an example, a display device can include one or more magnet registration connection zones. For example, consider a display device with zones in four quadrates of a back side. Such an approach can allows a bridging device to attach to top, bottom or sides of the display device. As explained, a ferromagnetic panel can include one or more additional fold axes, which may be defined by corresponding friction hinge assemblies, that allow for angle adjustment with respect to a display device (e.g., consider tilting the attached bridging device to an angle that may be anti-parallel to a plane of a display device).

As explained, in various examples, a stand may be utilized where, for example, attachment of a device with a ferromagnetic panel in an approximately 180 degree position can couple to the stand, which may be a dock. In such an example, a magnetic attraction force may be utilized for such coupling and/or one or more other coupling techniques. For example, an extended one-third surface of a ferromagnetic panel may fit into a channel in a top of a stand (e.g., a dock) or register with a back surface of a stand. In such examples, electrical interfaces may be included for electrically coupling the device and the stand, which, as mentioned, may be a dock with appropriate docking features (e.g., various types of circuitry, electrical connectors, etc.).

As an example, a dock approach can provide for docking and un-docking of a device with a ferromagnetic panel where the dock may support one or more other devices, optionally simultaneously. As an example, a dock may include one or more features such as a speaker, a microphone, a wireless charger, a small display, a removable small display device (e.g., a small tablet device, etc.), etc. As an example, a dock may be adjustable, for example, consider a dock that can included an extendible stand portion that can raise a device for improved ergonomic viewing. As explained, where magnetic attraction force is utilized, attachment and detachment of a device from a stand (e.g., a dock) can be performed quickly for physical coupling, optionally with electrical coupling.

As explained, a system may include one or more bridging devices, a bridging device and a display device, a bridging device and a stand, a bridging device and one or more other devices optionally including a stand, etc. As explained, a bridging device (e.g., or bridge device) can be utilized alone or in combination with one or more other devices. For example, consider a bridge device with a 180-degree hinge assembly being attachable to a large display, being attachable to another bridge device, being attachable to a dock (e.g., a stand), etc.

As an example, a device can include a housing that includes a front side that comprises a display operatively coupled to display circuitry and a back side that includes a ferromagnetic surface, a hinge assembly, and a recess; and a ferromagnetic panel transitionable via the hinge assembly from a storage position in the recess to a bridge position that covers the ferromagnetic surface. In such an example, the ferromagnetic surface can include at least one permanent magnet and/or the ferromagnetic panel can include at least one permanent magnet.

As an example, a ferromagnetic panel can include a first sub-panel and a second sub-panel. In such an example, the first sub-panel can be coupled directly to the hinge assembly. In such an example, in a bridge position, the second sub-panel can extend beyond an edge of a housing to which the ferromagnetic panel is coupled. As an example, at least one of a first sub-panel and a second sub-panel can include ferromagnetic material.

As an example, a hinge assembly of a device can include a dual-axis hinge that couples a housing to a ferromagnetic panel. In such an example, in a storage position of the ferromagnetic panel, the dual-axis hinge can be parallel to a back side of the housing and, in a bridge position of the ferromagnetic panel, the dual-axis hinge can be perpendicular to the back side.

As an example, a device can be coupled to another device that includes a ferromagnetic surface. In such an example, in a bridge position, a portion of a ferromagnetic panel of the device can extend beyond an edge of a housing of the device to secure the device to the ferromagnetic surface of the other device via magnetic force. In such an example, the other device can be an auxiliary display device.

As an example, ferromagnetic panel can include an electrical interface. For example, consider a spring-biased electrical interface (e.g., pogo-pins, etc.) where magnetic attraction force can provide for alignment with another electrical interface where the magnetic attraction force can apply pressure upon the spring-biased electrical interface (e.g., to maintain robust electrical coupling between the electrical interfaces).

As an example, a device can be coupled to a stand that includes a ferromagnetic surface. In such an example, in a bridge position of the device, a portion of a ferromagnetic panel of the device can extend beyond an edge of a housing of the device to secure the ferromagnetic panel to the ferromagnetic surface of the stand via magnetic force. In such an example, the stand can include a base and an upright that extends from the base. As an example, a stand can include docking circuitry (e.g., dock circuitry, etc.). As an example, a stand can include at least one speaker and/or a display. As an example, a stand can include voice enabled assistant (VEA) circuitry.

As an example, a device can include a keyboard housing or may be coupled to a keyboard housing where the keyboard housing includes a keyboard. As an example, a device can include multiple hinge assemblies where one of the hinge assemblies couples a housing (e.g., a display housing) and a keyboard housing to form a clamshell device.

As an example, a ferromagnetic panel of a device can be transitionable via a hinge assembly to a kickstand position, where an edge of a housing of the device and an end of the ferromagnetic panel are support surfaces. In such an example, in a bridge position, the edge of the housing can be opposite the end of the ferromagnetic panel.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 19:
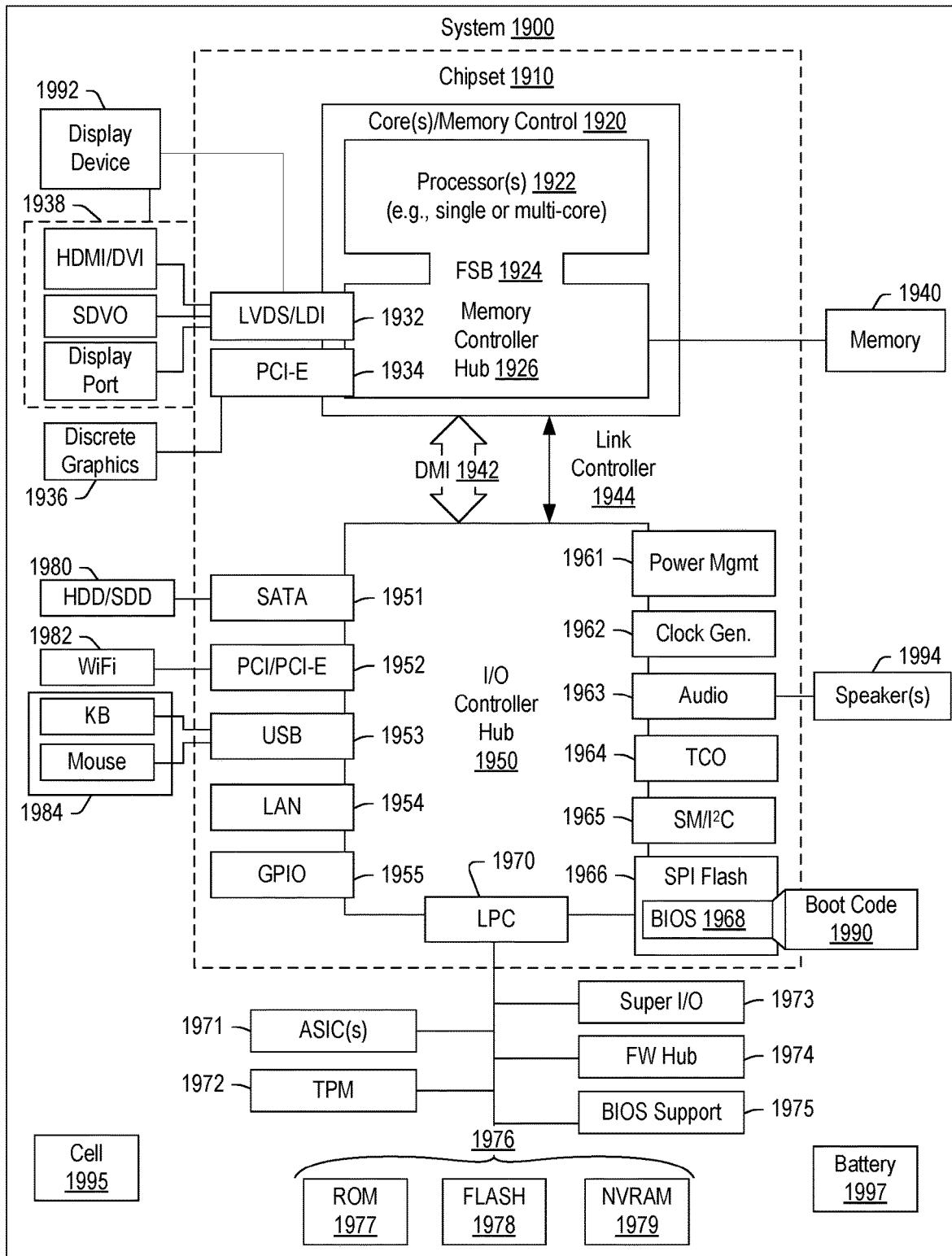
FIG. 19 is a diagram of an example of a system that includes one or more processors.

While various examples of circuits or circuitry have been discussed, FIG. 19 depicts a block diagram of an illustrative computer system 1900. The system 1900 may be a computer system, such as one of the LENOVO® THINKCENTRE® or LENOVO® THINKPAD® series of personal computers sold by Lenovo (US) Inc. of Morrisville, NC, or a workstation computer system, such as the LENOVO® THINKSTATION®, which are sold by Lenovo (US) Inc. of Morrisville, NC; however, as apparent from the description herein, a system or other machine may include other features or only some of the features of the system 1900. As an example, a display device may include features of the system 1900. As an example, a display device, which may be a computer system, may include one or more of the features of the LENOVO® IDEACENTRE® or THINKCENTRE® "all-in-one" (AIO) computing devices, which are sold by Lenovo (US) Inc. of Morrisville, NC. For example, the LENOVO® IDEACENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As an example, one or more of the device 100, the device 300, the device 500, the device 800, the device 900, the device 1000, the device 1100, etc., may include at least some of the features of the system 1900 and/or one or more features of the aforementioned computer systems, display devices, etc.

As shown in FIG. 19, the system 1900 includes a so-called chipset 1910. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 19, the chipset 1910 has a particular architecture, which may vary to some extent depending on brand or manufacturer. The architecture of the chipset 1910 includes a core and memory control group 1920 and an I/O controller hub 1950 that exchange information (e.g., data, signals, commands, etc.) via, for example, a direct management interface or direct media interface (DMI) 1942 or a link controller 1944. In the example of FIG. 19, the DMI 1942 is a chip-to-chip interface (sometimes referred to as being a link between a "northbridge" and a "southbridge").

The core and memory control group 1920 include one or more processors 1922 (e.g., single core or multi-core) and a memory controller hub 1926 that exchange information via a front side bus (FSB) 1924. As described herein, various components of the core and memory control group 1920 may be integrated onto a single processor die, for example, to make a chip that supplants the conventional "northbridge" style architecture.

The memory controller hub 1926 interfaces with memory 1940. For example, the memory controller hub 1926 may provide support for DDR SDRAM memory (e.g., DDR, DDR2, DDR3, etc.). In general, the memory 1940 is a type of random-access memory (RAM). It is often referred to as "system memory".

The memory controller hub 1926 further includes a low-voltage differential signaling interface (LVDS) 1932. The LVDS 1932 may be a so-called LVDS Display Interface (LDI) for support of a display device 1992 (e.g., a CRT, a flat panel, a projector, etc.). A block 1938 includes some examples of technologies that may be supported via the LVDS interface 1932 (e.g., serial digital video, HDMI/DVI, display port). The memory controller hub 1926 also includes one or more PCI-express interfaces (PCI-E) 1934, for example, for support of discrete graphics 1936. Discrete graphics using a PCI-E interface has become an alternative approach to an accelerated graphics port (AGP). For example, the memory controller hub 1926 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1950 includes a variety of interfaces. The example of FIG. 19 includes a SATA interface 1951, one or more PCI-E interfaces 1952 (optionally one or more legacy PCI interfaces), one or more USB interfaces 1953, a LAN interface 1954 (more generally a network interface), a general purpose I/O interface (GPIO) 1955, a low-pin count (LPC) interface 1970, a power management interface 1961, a clock generator interface 1962, an audio interface 1963 (e.g., for speakers 1994), a total cost of operation (TCO) interface 1964, a system management bus interface (e.g., a multi-master serial computer bus interface) 1965, and a serial peripheral flash memory/controller interface (SPI Flash) 1966, which, in the example of FIG. 19, includes BIOS 1968 and boot code 1990. With respect to network connections, the I/O hub controller 1950 may include integrated gigabit Ethernet controller lines multiplexed with a PCI-E interface port. Other network features may operate independent of a PCI-E interface.

The interfaces of the I/O hub controller 1950 provide for communication with various devices, networks, etc. For example, the SATA interface 1951 provides for reading, writing or reading and writing information on one or more drives 1980 such as HDDs, SDDs or a combination thereof. The I/O hub controller 1950 may also include an advanced host controller interface (AHCI) to support one or more drives 1980. The PCI-E interface 1952 allows for wireless connections 1982 to devices, networks, etc. The USB interface 1953 provides for input devices 1984 such as keyboards (KB), one or more optical sensors, mice and various other devices (e.g., microphones, cameras, phones, storage, media players, etc.). On or more other types of sensors may optionally rely on the USB interface 1953 or another interface (e.g., I$^2$C, etc.). As to microphones, the system 1900 of FIG. 19 may include hardware (e.g., audio card) appropriately configured for receipt of sound (e.g., user voice, ambient sound, etc.).

In the example of FIG. 19, the LPC interface 1970 provides for use of one or more ASICs 1971, a trusted platform module (TPM) 1972, a super I/O 1973, a firmware hub 1974, BIOS support 1975 as well as various types of memory 1976 such as ROM 1977, Flash 1978, and non-volatile RAM (NVRAM) 1979. With respect to the TPM 1972, this module may be in the form of a chip that can be used to authenticate software and hardware devices. For example, a TPM may be capable of performing platform authentication and may be used to verify that a system seeking access is the expected system.

The system 1900, upon power on, may be configured to execute boot code 1990 for the BIOS 1968, as stored within the SPI Flash 1966, and thereafter processes data under the control of one or more operating systems and application software (e.g., stored in system memory 1940). An operating system may be stored in any of a variety of locations and accessed, for example, according to instructions of the BIOS 1968. Again, as described herein, a satellite, a base, a server or other machine may include fewer or more features than shown in the system 1900 of FIG. 19. Further, the system 1900 of FIG. 19 is shown as optionally include cell phone circuitry 1995, which may include GSM, CDMA, etc., types of circuitry configured for coordinated operation with one or more of the other features of the system 1900. Also shown in FIG. 19 is battery circuitry 1997, which may provide one or more battery, power, etc., associated features (e.g., optionally to instruct one or more other components of the system 1900). As an example, a SMBus may be operable via a LPC (see, e.g., the LPC interface 1970), via an I$^2$C interface (see, e.g., the SM/I$^2$C interface 1965), etc.

Although examples of methods, devices, systems, etc., have been described in language specific to structural features and/or methodological acts, it is to be understood that the subject matter defined in the appended claims is not necessarily limited to the specific features or acts described.

Rather, the specific features and acts are disclosed as examples of forms of implementing the claimed methods, devices, systems, etc.

What is claimed is:

1. A device comprising:
a housing that comprises a top edge, a bottom edge, a front side that comprises a display operatively coupled to display circuitry and a back side that comprises, ordered from the bottom edge to the top edge, a ferromagnetic surface, a hinge assembly, and a recess; and
a ferromagnetic panel transitionable via the hinge assembly from a storage position in the recess of the back side of the housing to a bridge position that covers the ferromagnetic surface of the back side of the housing, wherein the ferromagnetic panel comprises a first sub-panel and a second sub-panel that comprise ferromagnetic material, wherein the first sub-panel is coupled directly to the hinge assembly of the back side of the housing, and wherein, in the bridge position, the first sub-panel covers the ferromagnetic surface of the back side of the housing and is secured to the ferromagnetic surface of the back side of the housing via magnetic force, and the second sub-panel extends beyond the bottom edge of the housing for magnetic coupling of the device to another device.

2. The device of claim 1, wherein the ferromagnetic surface comprises at least one permanent magnet.

3. The device of claim 1, wherein the ferromagnetic panel comprises at least one permanent magnet.

4. The device of claim 1, further comprising the other device, wherein the other device comprises a ferromagnetic surface.

5. The device of claim 4, wherein, in the bridge position, the second sub-panel secures to the ferromagnetic surface of the other device via magnetic force.

6. The device of claim 4, wherein the other device is an auxiliary display device.

7. The device of claim 1, wherein the ferromagnetic panel comprises an electrical interface.

8. The device of claim 1, comprising the other device, wherein the other device comprises a stand that comprises a ferromagnetic surface.

9. The device of claim 8, wherein, in the bridge position, the second sub-panel extends beyond the bottom edge of the housing and secures to the ferromagnetic surface of the stand via magnetic force.

10. The device of claim 8, wherein the stand comprises docking circuitry.

11. The device of claim 8, wherein the stand comprises at least one speaker.

12. The device of claim 8, wherein the stand comprises voice enabled assistant circuitry.

13. The device of claim 1, wherein the ferromagnetic panel is transitionable via the hinge assembly to a kickstand position, wherein the top edge of the housing and an end of the second sub-panel are support surfaces.

14. The device of claim 13, wherein, in the bridge position, the top edge of the housing is opposite the end of the second sub-panel.

15. The device of claim 1, wherein the hinge assembly comprises a dual-axis hinge.

16. The device of claim 15, wherein, in the storage position, the dual-axis hinge is parallel to the back side and wherein, in the bridge position, the dual-axis hinge is perpendicular to the back side.

17. The device of claim 1, wherein the housing comprises a left edge and a right edge.

18. The device of claim 17, wherein the ferromagnetic panel extends between the left edge and the right edge.

19. The device of claim 17, wherein the recess extends between the left edge and the right edge.

* * * * *